United States Patent
Chen et al.

(10) Patent No.: US 9,851,535 B2
(45) Date of Patent: Dec. 26, 2017

(54) OPTICAL IMAGING LENS

(71) Applicant: GeniuS Electronic Optical Co., Ltd., Taichung (TW)

(72) Inventors: Shih-Han Chen, Taichung (TW); Baina Chen, Xiamen (CN); Bo Chong, Xiamen (CN)

(73) Assignee: GeniuS Electronic Optical (Xiamen) Co., Ltd., Xiamen (CN)

( * ) Notice: Subject to any disclaimer, the term of this patent is extended or adjusted under 35 U.S.C. 154(b) by 119 days.

(21) Appl. No.: 14/872,091

(22) Filed: Sep. 30, 2015

(65) Prior Publication Data

US 2017/0045713 A1   Feb. 16, 2017

(30) Foreign Application Priority Data

Aug. 10, 2015  (CN) .......................... 2015 1 0485614

(51) Int. Cl.
  *G02B 9/60* (2006.01)
  *G02B 13/00* (2006.01)
  *G02B 27/00* (2006.01)

(52) U.S. Cl.
  CPC .......... *G02B 13/0045* (2013.01); *G02B 9/60* (2013.01); *G02B 27/0025* (2013.01)

(58) Field of Classification Search
  CPC ... G02B 13/0045; G02B 9/60; G02B 27/0025
  See application file for complete search history.

(56) References Cited

U.S. PATENT DOCUMENTS

| 8,248,713 | B2 * | 8/2012 | Hsieh | ................. G02B 13/0045 |
| | | | | 359/714 |
| 8,395,853 | B2 | 3/2013 | Chen et al. | |
| 8,654,458 | B2 | 2/2014 | Tsai et al. | |
| 8,699,150 | B1 | 4/2014 | Hsieh et al. | |
| 2015/0168675 | A1 | 6/2015 | Lee et al. | |

FOREIGN PATENT DOCUMENTS

| CN | 201434932 Y | 3/2010 |
| KR | 100859103 B1 | 9/2008 |

OTHER PUBLICATIONS

Chinese Office Action dated May 15, 2017 in connection with Chinese Application No. 201510485614.8, 10 pages.

* cited by examiner

*Primary Examiner* — Joseph P Martinez
(74) *Attorney, Agent, or Firm* — Baker & McKenzie LLP

(57) ABSTRACT

Present embodiments provide for an optical imaging lens. The optical imaging lens may comprise five lens elements positioned sequentially from an object side to an image side. By controlling the convex or concave shape of the surfaces of the lens elements and designing parameters satisfying at least one inequality, the view angle of the optical imaging lens may be increased to achieve better optical characteristics.

19 Claims, 31 Drawing Sheets

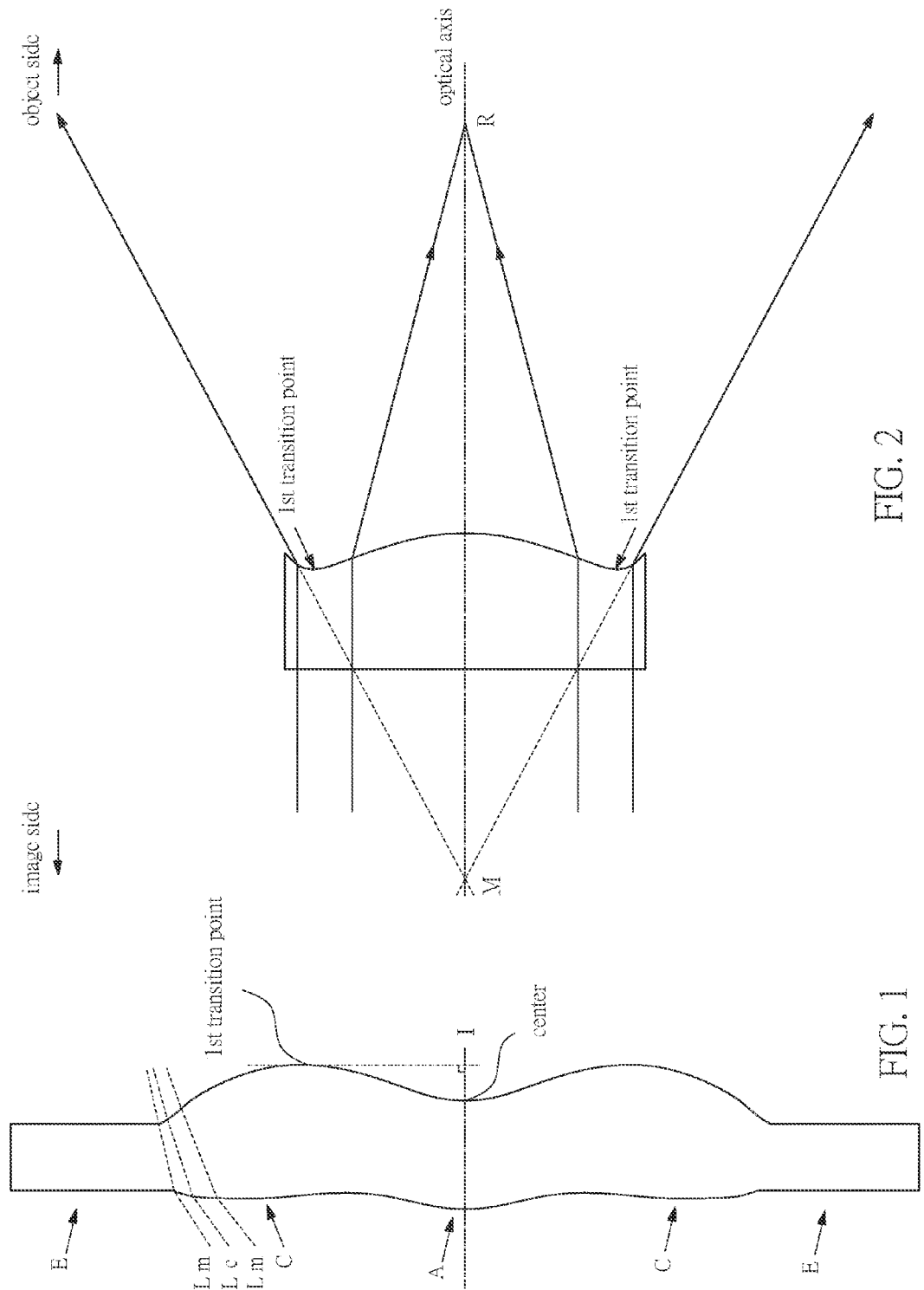

| \multicolumn{7}{c}{EFL(Effective focus length)= 1.631mm, HFOV(Half angular field of view)= 102deg., Image height=2.319mm, System length=14.570mm, Fno=2.099} |

| Surface # |  | Radius | Thickness | Refractive index | Abbe number | Focus | Material |
|---|---|---|---|---|---|---|---|
| - | Object | 100000 | 1000000 |  |  |  |  |
| 111 | 1st lens element | 11.687 | 0.946_T1 | 1.728_n1 | 28.320_v1 | -4.238_f1 | glass |
| 112 |  | 2.370 | 2.834_G12 |  |  |  |  |
| 121 | 2nd lens lement | -2.904 | 3.069_T2 | 1.531_n2 | 55.745_v2 | 16.409_f2 | plastic |
| 122 |  | -2.981 | 0.474_G2A |  |  |  |  |
| 100 | Aperture stop | 0.000 | -0.133_TA |  |  |  |  |
| 131 | 3rd lens element | 2.678 | 3.034_T3 | 1.531_n3 | 55.745_v3 | 2.618_f3 | plastic |
| 132 |  | -1.765 | 0.208_G34 |  |  |  |  |
| 141 | 4th lens element | -1.795 | 0.819_T4 | 1.633_n4 | 23.336_v4 | -1.732_f4 | plastic |
| 142 |  | 3.381 | 0.152_G45 |  |  |  |  |
| 151 | 5th lens element | 2.614 | 1.857_T5 | 1.531_n5 | 55.745_v5 | 2.898_f5 | plastic |
| 152 |  | -2.841 | 0.100_G5F |  |  |  |  |
| 161 | IR cut filter | 0.000 | 0.210_TF | 1.517_nf | 64.167 |  |  |
| 162 |  | 0.000 | 0.450_GFC |  |  |  |  |
| 171 | Protection element | 0.000 | 0.400_TC | 1.517_nc | 64.167 |  |  |
| 172 |  | 0.000 | 0.151_GCP |  |  |  |  |
| 180 | Image plane | 0.000 | 0.000 |  |  |  |  |

FIG. 8

| Aspherical parameters | | | | |
|---|---|---|---|---|
| Surface # | 121 | 122 | 131 | 132 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -3.1523E-03 | -1.7641E-03 | -5.5344E-03 | -7.1509E-02 |
| $a_6$ | 9.5151E-05 | 2.2116E-03 | -8.4783E-03 | 1.6035E-01 |
| $a_8$ | -2.2896E-05 | 7.4700E-04 | 1.4855E-02 | -9.7176E-02 |
| $a_{10}$ | 2.4665E-05 | -4.5289E-04 | -5.8556E-03 | 2.2691E-02 |
| $a_{12}$ | 8.0458E-06 | 1.0690E-04 | -9.4425E-03 | 3.5752E-03 |
| $a_{14}$ | -1.5106E-07 | -7.5964E-05 | 1.0898E-02 | -4.6360E-03 |
| $a_{16}$ | -1.3396E-07 | 2.1874E-05 | -3.3874E-03 | 1.1821E-03 |
| Surface # | 141 | 142 | 151 | 152 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.7632E-01 | -1.1313E-01 | -3.3045E-02 | 6.0721E-02 |
| $a_6$ | 3.0795E-01 | 6.8207E-02 | -1.5071E-03 | -1.0099E-02 |
| $a_8$ | -2.1426E-01 | -2.2968E-02 | 2.8857E-03 | -8.6180E-04 |
| $a_{10}$ | 7.7507E-02 | 4.5455E-03 | -5.0039E-04 | 6.8091E-04 |
| $a_{12}$ | -1.0126E-02 | -5.1435E-04 | -3.7325E-05 | -6.4373E-05 |
| $a_{14}$ | -6.8458E-03 | -6.8876E-05 | 1.2117E-05 | -1.5259E-06 |
| $a_{16}$ | 2.8026E-03 | 2.5467E-05 | -5.5479E-07 | 3.3551E-08 |

FIG. 9

| EFL(Effective focus length)= 1.534mm, HFOV(Half angular field of view)= 102deg., Image height=2.339mm, System length=14.451mm, Fno=2.101 ||||||||
|---|---|---|---|---|---|---|---|
| Surface # | | Radius | Thickness | Refractive index | Abbe number | Focus | Material |
| - | Object | 100000 | 10000 | | | | |
| 211 | 1st lens element | 10.468 | 0.985_T1 | 1.728_n1 | 28.320_v1 | -4.056_f1 | glass |
| 212 | | 2.223 | 2.759_G12 | | | | |
| 221 | 2nd lens lement | -3.555 | 3.431_T2 | 1.531_n2 | 55.745_v2 | 17.574_f2 | plastic |
| 222 | | -3.441 | 0.624_G2A | | | | |
| 200 | Aperture stop | 0.000 | -0.133_TA | | | | |
| 231 | 3rd lens element | 2.406 | 2.578_T3 | 1.531_n3 | 55.745_v3 | 2.472_f3 | plastic |
| 232 | | -1.828 | 0.151_G34 | | | | |
| 241 | 4th lens element | -1.944 | 0.775_T4 | 1.633_n4 | 23.336_v4 | -1.843_f4 | plastic |
| 242 | | 3.434 | 0.148_G45 | | | | |
| 251 | 5th lens element | 2.583 | 1.811_T5 | 1.531_n5 | 55.745_v5 | 3.280_f5 | plastic |
| 252 | | -4.088 | 0.100_G5F | | | | |
| 261 | IR cut filter | 0.000 | 0.210_TF | 1.517_nf | 64.167 | | |
| 262 | | 0.000 | 0.450_GFC | | | | |
| 271 | Protection element | 0.000 | 0.400_TC | 1.517_nc | 64.167 | | |
| 272 | | 0.000 | 0.162_GCP | | | | |
| 280 | Image plane | 0.000 | 0.000 | | | | |

FIG.12

| Aspherical parameters | | | | |
|---|---|---|---|---|
| Surface # | 221 | 222 | 231 | 232 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.2919E-03 | -1.2568E-03 | -1.1527E-03 | -7.5928E-02 |
| $a_6$ | 1.7400E-05 | 7.8134E-04 | -1.0449E-02 | 1.6234E-01 |
| $a_8$ | -2.8248E-05 | 5.6604E-04 | 1.4252E-02 | -9.7479E-02 |
| $a_{10}$ | 1.8867E-06 | -4.0159E-04 | -5.6504E-03 | 2.1970E-02 |
| $a_{12}$ | 5.2783E-06 | 2.6042E-04 | -9.2281E-03 | 3.3993E-03 |
| $a_{14}$ | 2.6658E-07 | -7.5443E-05 | 1.0893E-02 | -4.5745E-03 |
| $a_{16}$ | -1.8989E-07 | 7.0300E-06 | -3.4821E-03 | 1.2465E-03 |
| Surface # | 241 | 242 | 251 | 252 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.8400E-01 | -1.0486E-01 | -3.7415E-02 | 4.4741E-02 |
| $a_6$ | 3.0788E-01 | 6.8870E-02 | -2.2046E-03 | -1.0462E-02 |
| $a_8$ | -2.1452E-01 | -2.2919E-02 | 2.8349E-03 | -9.5322E-04 |
| $a_{10}$ | 7.7442E-02 | 4.5014E-03 | -5.0785E-04 | 6.4794E-04 |
| $a_{12}$ | -1.0115E-02 | -5.1637E-04 | -4.1629E-05 | -6.5840E-05 |
| $a_{14}$ | -6.7472E-03 | -6.1242E-05 | 1.1511E-05 | -1.0901E-06 |
| $a_{16}$ | 2.8255E-03 | 2.9605E-05 | 5.1538E-08 | 1.7099E-07 |

FIG. 13

| EFL(Effective focus length)= 1.360mm, HFOV(Half angular field of view)= 102deg., Image height=1.932mm, System length=15.131mm, Fno=2.104 |||||||
|---|---|---|---|---|---|---|---|
| Surface # | | Radius | Thickness | Refractive index | Abbe number | Focus | Material |
| - | Object | 10000 | 10000 | | | | |
| 311 | 1st lens element | 10.682 | 1.160_T1 | 1.728_n1 | 28.320_v1 | -4.120_f1 | glass |
| 312 | | 2.246 | 3.497_G12 | | | | |
| 321 | 2nd lens lement | -3.012 | 3.149_T2 | 1.531_n2 | 55.745_v2 | 14.272_f2 | plastic |
| 322 | | -2.941 | 0.998_G2A | | | | |
| 300 | Aperture stop | 0.000 | -0.133_TA | | | | |
| 331 | 3rd lens element | 2.409 | 2.558_T3 | 1.531_n3 | 55.745_v3 | 2.465_f3 | plastic |
| 332 | | -1.822 | 0.152_G34 | | | | |
| 341 | 4th lens element | -1.945 | 0.749_T4 | 1.633_n4 | 23.336_v4 | -1.843_f4 | plastic |
| 342 | | 3.414 | 0.122_G45 | | | | |
| 351 | 5th lens element | 2.474 | 1.827_T5 | 1.531_n5 | 55.745_v5 | 3.245_f5 | plastic |
| 352 | | -4.270 | 0.100_G5F | | | | |
| 361 | IR cut filter | 0.000 | 0.210_TF | 1.517_nf | 64.167 | | |
| 362 | | 0.000 | 0.242_GFC | | | | |
| 371 | Protection element | 0.000 | 0.400_TC | 1.517_nc | 64.167 | | |
| 372 | | 0.000 | 0.100_GCP | | | | |
| 380 | Image plane | 0.000 | 0.000 | | | | |

FIG. 16

| Aspherical parameters | | | | |
|---|---|---|---|---|
| Surface # | 321 | 322 | 331 | 332 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.5063E-03 | 7.8814E-04 | -9.8571E-04 | -7.6273E-02 |
| $a_6$ | -5.1694E-05 | 1.2944E-03 | -1.0371E-02 | 1.6238E-01 |
| $a_8$ | -8.2818E-05 | 5.6708E-04 | 1.4323E-02 | -9.7488E-02 |
| $a_{10}$ | -9.5345E-06 | -5.3983E-04 | -5.6260E-03 | 2.1857E-02 |
| $a_{12}$ | 6.8743E-06 | 2.5953E-04 | -9.2584E-03 | 3.4133E-03 |
| $a_{14}$ | 4.5897E-07 | -7.3838E-05 | 1.0839E-02 | -4.5559E-03 |
| $a_{16}$ | -1.0943E-07 | 7.1516E-06 | -3.4809E-03 | 1.2478E-03 |
| Surface # | 341 | 342 | 351 | 352 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.8395E-01 | -1.0440E-01 | -3.4898E-02 | 4.4021E-02 |
| $a_6$ | 3.0783E-01 | 6.9167E-02 | -2.1990E-03 | -1.1095E-02 |
| $a_8$ | -2.1461E-01 | -2.3047E-02 | 2.8261E-03 | -9.1609E-04 |
| $a_{10}$ | 7.7447E-02 | 4.5221E-03 | -5.1074E-04 | 6.5867E-04 |
| $a_{12}$ | -1.0113E-02 | -5.1525E-04 | -4.1927E-05 | -6.7889E-05 |
| $a_{14}$ | -6.7473E-03 | -6.0013E-05 | 1.1435E-05 | -1.1961E-06 |
| $a_{16}$ | 2.8218E-03 | 2.9562E-05 | 2.8294E-08 | 1.4096E-07 |

FIG. 17

| \multicolumn{8}{c}{EFL(Effective focus length)= 1.468mm, HFOV(Half angular field of view)= 102deg., Image height=2.183mm, System length=14.771mm, Fno=2.103} |
|---|---|---|---|---|---|---|---|

| Surface # | | Radius | Thickness | Refractive index | Abbe number | Focus | Material |
|---|---|---|---|---|---|---|---|
| - | Object | 10000 | 10000 | | | | |
| 411 | 1st lens element | 10.345 | 0.966_T1 | 1.728_n1 | 28.320_v1 | -4.070_f1 | glass |
| 412 | | 2.224 | 2.897_G12 | | | | |
| 421 | 2nd lens lement | -3.474 | 3.658_T2 | 1.531_n2 | 55.745_v2 | 16.324_f2 | plastic |
| 422 | | -3.391 | 0.631_G2A | | | | |
| 400 | Aperture stop | 0.000 | -0.133_TA | | | | |
| 431 | 3rd lens element | 2.407 | 2.598_T3 | 1.531_n3 | 55.745_v3 | 2.477_f3 | plastic |
| 432 | | -1.826 | 0.152_G34 | | | | |
| 441 | 4th lens element | -1.944 | 0.791_T4 | 1.633_n4 | 23.336_v4 | -1.836_f4 | plastic |
| 442 | | 3.410 | 0.150_G45 | | | | |
| 451 | 5th lens element | 2.609 | 1.907_T5 | 1.531_n5 | 55.745_v5 | 3.296_f5 | plastic |
| 452 | | -4.006 | 0.100_G5F | | | | |
| 461 | IR cut filter | 0.000 | 0.210_TF | 1.517_nf | 64.167 | | |
| 462 | | 0.000 | 0.344_GFC | | | | |
| 471 | Protection element | 0.000 | 0.400_TC | 1.517_nc | 64.167 | | |
| 472 | | 0.000 | 0.100_GCP | | | | |
| 480 | Image plane | 0.000 | 0.000 | | | | |

FIG. 20

| Aspherical parameters | | | | |
|---|---|---|---|---|
| Surface # | 421 | 422 | 431 | 432 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.3863E-03 | -6.5380E-04 | -1.1683E-03 | -7.6000E-02 |
| $a_6$ | -1.6241E-05 | 7.9916E-04 | -1.0374E-02 | 1.6235E-01 |
| $a_8$ | -3.8881E-05 | 6.7888E-04 | 1.4299E-02 | -9.7478E-02 |
| $a_{10}$ | 1.6891E-06 | -4.1669E-04 | -5.6330E-03 | 2.1967E-02 |
| $a_{12}$ | 6.3806E-06 | 2.6389E-04 | -9.2527E-03 | 3.3969E-03 |
| $a_{14}$ | 2.8396E-07 | -7.2031E-05 | 1.0847E-02 | -4.5748E-03 |
| $a_{16}$ | -1.2215E-07 | 6.8429E-06 | -3.4754E-03 | 1.2472E-03 |
| Surface # | 441 | 442 | 451 | 452 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.8400E-01 | -1.0481E-01 | -3.6940E-02 | 4.4773E-02 |
| $a_6$ | 3.0785E-01 | 6.8900E-02 | -2.1976E-03 | -1.0488E-02 |
| $a_8$ | -2.1452E-01 | -2.2910E-02 | 2.8307E-03 | -9.5858E-04 |
| $a_{10}$ | 7.7442E-02 | 4.5045E-03 | -5.0935E-04 | 6.4650E-04 |
| $a_{12}$ | -1.0113E-02 | -5.1639E-04 | -4.1798E-05 | -6.6054E-05 |
| $a_{14}$ | -6.7452E-03 | -6.0867E-05 | 1.1522E-05 | -1.1762E-06 |
| $a_{16}$ | 2.8255E-03 | 2.9827E-05 | 6.3276E-08 | 1.4745E-07 |

FIG. 21

| EFL(Effective focus length)= 1.339mm, HFOV(Half angular field of view)= 102deg., Image height=1.875mm, System length=15.664mm, Fno=2.104 | | | | | | | |
|---|---|---|---|---|---|---|---|
| Surface # | | Radius | Thickness | Refractive index | Abbe number | Focus | Material |
| - | Object | 10000 | 10000 | | | | |
| 511 | 1st lens element | 12.756 | 1.299_T1 | 1.728_n1 | 28.320_v1 | -4.131_f1 | glass |
| 512 | | 2.341 | 3.761_G12 | | | | |
| 521 | 2nd lens lement | -3.011 | 3.445_T2 | 1.531_n2 | 55.745_v2 | 19.013_f2 | plastic |
| 522 | | -3.244 | 0.514_G2A | | | | |
| 500 | Aperture stop | 0.000 | -0.133_TA | | | | |
| 531 | 3rd lens element | 2.458 | 2.513_T3 | 1.531_n3 | 55.745_v3 | 2.459_f3 | plastic |
| 532 | | -1.809 | 0.148_G34 | | | | |
| 541 | 4th lens element | -1.933 | 0.623_T4 | 1.633_n4 | 23.336_v4 | -1.852_f4 | plastic |
| 542 | | 3.418 | 0.277_G45 | | | | |
| 551 | 5th lens element | 2.790 | 1.783_T5 | 1.531_n5 | 55.745_v5 | 3.272_f5 | plastic |
| 552 | | -3.614 | 0.100_G5F | | | | |
| 561 | IR cut filter | 0.000 | 0.210_TF | 1.517_nf | 64.167 | | |
| 562 | | 0.000 | 0.450_GFC | | | | |
| 571 | Protection element | 0.000 | 0.400_TC | 1.517_nc | 64.167 | | |
| 572 | | 0.000 | 0.276_GCP | | | | |
| 580 | Image plane | 0.000 | 0.000 | | | | |

FIG. 24

| Aspherical parameters | | | | |
|---|---|---|---|---|
| Surface # | 521 | 522 | 531 | 532 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.1948E-03 | 1.5584E-03 | -1.1072E-03 | -7.5911E-02 |
| $a_6$ | 2.5186E-04 | 1.5182E-03 | -1.0196E-02 | 1.6257E-01 |
| $a_8$ | 1.4006E-05 | 2.4614E-04 | 1.4395E-02 | -9.7586E-02 |
| $a_{10}$ | -3.7045E-05 | -8.1803E-04 | -5.6116E-03 | 2.1874E-02 |
| $a_{12}$ | -2.2609E-05 | 2.8357E-04 | -9.2711E-03 | 3.3797E-03 |
| $a_{14}$ | -4.0851E-06 | -1.7809E-04 | 1.0802E-02 | -4.5671E-03 |
| $a_{16}$ | 8.4086E-07 | 5.0918E-05 | -3.4809E-03 | 1.2801E-03 |
| Surface # | 541 | 542 | 551 | 552 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.8449E-01 | -1.0515E-01 | -3.3234E-02 | 4.1490E-02 |
| $a_6$ | 3.0757E-01 | 6.9160E-02 | -2.2160E-03 | -1.0720E-02 |
| $a_8$ | -2.1442E-01 | -2.2852E-02 | 2.8104E-03 | -9.7034E-04 |
| $a_{10}$ | 7.7581E-02 | 4.5058E-03 | -5.1340E-04 | 6.4414E-04 |
| $a_{12}$ | -1.0030E-02 | -5.2025E-04 | -4.1496E-05 | -6.6279E-05 |
| $a_{14}$ | -6.7114E-03 | -6.2239E-05 | 1.1783E-05 | -1.2076E-06 |
| $a_{16}$ | 2.8318E-03 | 2.9865E-05 | 5.6525E-08 | 1.6704E-07 |

FIG. 25

| \multicolumn{7}{|c|}{EFL(Effective focus length)= 1.041mm, HFOV(Half angular field of view)= 100deg., Image height=1.24mm, System length=18.361mm, Fno=2.070} |
|---|---|---|---|---|---|---|---|
| Surface # | | Radius | Thickness | Refractive index | Abbe number | Focus | Material |
| - | Object | 10000 | 10000 | | | | |
| 611 | 1st lens element | 13.182 | 1.563_T1 | 1.729_n1 | 54.674_v1 | -3.799_f1 | glass |
| 612 | | 2.181 | 4.108_G12 | | | | |
| 621 | 2nd lens lement | -2.869 | 3.949_T2 | 1.531_n2 | 55.745_v2 | 38.722_f2 | plastic |
| 622 | | -3.724 | 1.780_G2A | | | | |
| 600 | Aperture stop | 0.000 | -0.135_TA | | | | |
| 631 | 3rd lens element | 2.545 | 2.463_T3 | 1.531_n3 | 55.745_v3 | 2.496_f3 | plastic |
| 632 | | -1.849 | 0.210_G34 | | | | |
| 641 | 4th lens element | -1.837 | 1.105_T4 | 1.633_n4 | 23.336_v4 | -1.905_f4 | plastic |
| 642 | | 4.426 | 0.397_G45 | | | | |
| 651 | 5th lens element | 2.225 | 1.648_T5 | 1.531_n5 | 55.745_v5 | 2.792_f5 | plastic |
| 652 | | -3.333 | 0.100_G5F | | | | |
| 661 | IR cut filter | 0.000 | 0.210_TF | 1.517_nf | 64.167 | | |
| 662 | | 0.000 | 0.500_GFC | | | | |
| 671 | Protection element | 0.000 | 0.400_TC | 1.517_nc | 64.167 | | |
| 672 | | 0.000 | 0.063_GCP | | | | |
| 680 | Image plane | 0.000 | 0.000 | | | | |

FIG. 28

| | Aspherical parameters | | | |
|---|---|---|---|---|
| Surface # | 621 | 622 | 631 | 632 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -2.0641E-03 | -1.8478E-03 | -1.1260E-03 | -9.3220E-02 |
| $a_6$ | -1.0016E-04 | 8.9913E-04 | -1.9248E-02 | 1.5148E-01 |
| $a_8$ | 7.1366E-05 | -1.8013E-05 | 2.4855E-02 | -5.8689E-02 |
| $a_{10}$ | 8.7937E-05 | -1.6667E-04 | -8.4934E-04 | -8.2904E-03 |
| $a_{12}$ | -6.3547E-06 | 2.7124E-05 | -3.9775E-02 | 1.6140E-03 |
| $a_{14}$ | -2.2985E-06 | 2.2887E-05 | 4.3694E-02 | 4.9137E-03 |
| $a_{16}$ | -9.0140E-07 | -2.7013E-06 | -1.5226E-02 | -1.2544E-03 |
| Surface # | 641 | 642 | 651 | 652 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -2.2826E-01 | -1.1588E-01 | -2.3743E-02 | 5.1827E-02 |
| $a_6$ | 3.2938E-01 | 6.4247E-02 | -4.4753E-03 | -1.6758E-02 |
| $a_8$ | -1.8366E-01 | -1.3538E-02 | 2.5786E-03 | 1.7144E-04 |
| $a_{10}$ | 4.3772E-02 | 1.0135E-03 | -3.1466E-04 | 6.4761E-04 |
| $a_{12}$ | -9.8214E-03 | -5.0806E-04 | -4.4708E-05 | -2.8202E-05 |
| $a_{14}$ | 2.0803E-04 | 2.7752E-05 | -1.3421E-05 | 3.6604E-06 |
| $a_{16}$ | 1.4968E-03 | 5.8875E-07 | 3.2529E-06 | 3.8344E-07 |

FIG. 29

| EFL(Effective focus length)= 1.455mm, HFOV(Half angular field of view)= 102deg., Image height=1.952mm, System length=14.482mm, Fno=2.093 ||||||||
|---|---|---|---|---|---|---|---|
| Surface # | | Radius | Thickness | Refractive index | Abbe number | Focus | Material |
| - | Object | 10000 | 10000 | | | | |
| 711 | 1st lens element | 11.136 | 0.554_T1 | 1.729_n1 | 54.674_v1 | -4.249_f1 | glass |
| 712 | | 2.379 | 3.000_G12 | | | | |
| 721 | 2nd lens lement | -3.386 | 3.317_T2 | 1.531_n2 | 55.745_v2 | 19.032_f2 | plastic |
| 722 | | -3.403 | 1.438_G2A | | | | |
| 700 | Aperture stop | 0.000 | 0.004_TA | | | | |
| 731 | 3rd lens element | 2.105 | 2.065_T3 | 1.531_n3 | 55.745_v3 | 2.321_f3 | plastic |
| 732 | | -1.977 | 0.146_G34 | | | | |
| 741 | 4th lens element | -1.858 | 0.837_T4 | 1.633_n4 | 23.336_v4 | -1.715_f4 | plastic |
| 742 | | 3.122 | 0.116_G45 | | | | |
| 751 | 5th lens element | 2.342 | 1.549_T5 | 1.531_n5 | 55.745_v5 | 3.289_f5 | plastic |
| 752 | | -5.359 | 0.100_G5F | | | | |
| 761 | IR cut filter | 0.000 | 0.210_TF | 1.517_nf | 64.167 | | |
| 762 | | 0.000 | 0.450_GFC | | | | |
| 771 | Protection element | 0.000 | 0.400_TC | 1.517_nc | 64.167 | | |
| 772 | | 0.000 | 0.296_GCP | | | | |
| 780 | Image plane | 0.000 | 0.000 | | | | |

FIG. 32

| Aspherical parameters | | | | |
|---|---|---|---|---|
| Surface # | 721 | 722 | 731 | 732 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -3.1890E-03 | 2.1578E-04 | 8.5567E-04 | -8.5766E-02 |
| $a_6$ | -6.7737E-06 | 1.0649E-03 | -9.5860E-03 | 1.6306E-01 |
| $a_8$ | -1.9340E-05 | 4.7350E-04 | 1.3625E-02 | -1.0105E-01 |
| $a_{10}$ | 3.6975E-06 | -4.5981E-04 | -6.0364E-03 | 2.0506E-02 |
| $a_{12}$ | 5.3693E-06 | 2.5118E-04 | -9.1479E-03 | 3.1409E-03 |
| $a_{14}$ | 9.2077E-08 | -7.6746E-05 | 1.1011E-02 | -4.4202E-03 |
| $a_{16}$ | -7.7685E-08 | 9.3391E-06 | -3.5259E-03 | 1.4137E-03 |
| Surface # | 741 | 742 | 751 | 752 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.7732E-01 | -9.3858E-02 | -2.9074E-02 | 5.2028E-02 |
| $a_6$ | 2.9561E-01 | 7.2043E-02 | -3.3806E-03 | -1.3095E-02 |
| $a_8$ | -2.1507E-01 | -2.4674E-02 | 3.0316E-03 | -1.0948E-03 |
| $a_{10}$ | 7.7495E-02 | 4.4658E-03 | -4.6878E-04 | 6.7820E-04 |
| $a_{12}$ | -1.0401E-02 | -1.2827E-04 | -7.0993E-05 | -5.7191E-05 |
| $a_{14}$ | -6.7162E-03 | 1.1353E-04 | 3.4382E-06 | -1.2111E-06 |
| $a_{16}$ | 2.9286E-03 | -8.2525E-05 | 1.2284E-06 | -1.0487E-06 |

FIG. 33

| \multicolumn{7}{|c|}{EFL(Effective focus length)= 1.242mm, HFOV(Half angular field of view)= 100deg., Image height=1.661mm, System length=16.006mm, Fno=2.084} |
|---|---|---|---|---|---|---|
| Surface # | | Radius | Thickness | Refractive index | Abbe number | Focus | Material |
| - | Object | 10000 | 10000 | | | | |
| 811 | 1st lens element | 10.706 | 1.083_T1 | 1.729_n1 | 54.674_v1 | -4.022_f1 | glass |
| 812 | | 2.210 | 3.386_G12 | | | | |
| 821 | 2nd lens element | -3.739 | 3.917_T2 | 1.531_n2 | 55.745_v2 | 13.467_f2 | plastic |
| 822 | | -3.353 | 1.397_G2A | | | | |
| 800 | Aperture stop | 0.000 | -0.135_TA | | | | |
| 831 | 3rd lens element | 2.481 | 2.578_T3 | 1.531_n3 | 55.745_v3 | 2.483_f3 | plastic |
| 832 | | -1.811 | 0.176_G34 | | | | |
| 841 | 4th lens element | -1.915 | 0.799_T4 | 1.633_n4 | 23.336_v4 | -1.865_f4 | plastic |
| 842 | | 3.648 | 0.223_G45 | | | | |
| 851 | 5th lens element | 2.597 | 1.410_T5 | 1.531_n5 | 55.745_v5 | 2.918_f5 | plastic |
| 852 | | -3.145 | 0.100_G5F | | | | |
| 861 | IR cut filter | 0.000 | 0.210_TF | 1.517_nf | 64.167 | | |
| 862 | | 0.000 | 0.362_GFC | | | | |
| 871 | Protection element | 0.000 | 0.400_TC | 1.517_nc | 64.167 | | |
| 872 | | 0.000 | 0.100_GCP | | | | |
| 880 | Image plane | 0.000 | 0.000 | | | | |

FIG. 36

| Aspherical parameters | | | | |
|---|---|---|---|---|
| Surface # | 821 | 822 | 831 | 832 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -2.5365E-03 | 6.4328E-04 | 1.5338E-03 | -1.0411E-01 |
| $a_6$ | -6.2668E-04 | -9.0597E-05 | -1.9441E-02 | 1.4236E-01 |
| $a_8$ | -1.5257E-04 | 4.8866E-05 | 1.9903E-02 | -5.9158E-02 |
| $a_{10}$ | 5.2507E-05 | -5.7431E-06 | -1.1152E-03 | -7.8177E-03 |
| $a_{12}$ | -1.2731E-05 | -7.4399E-06 | -3.7043E-02 | 2.1044E-03 |
| $a_{14}$ | -2.2843E-07 | 1.9655E-06 | 4.6535E-02 | 5.2301E-03 |
| $a_{16}$ | 2.1577E-07 | -2.2639E-09 | -1.9158E-02 | -1.1888E-03 |
| Surface # | 841 | 842 | 851 | 852 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -2.5577E-01 | -9.5191E-02 | -7.5642E-03 | 6.0860E-02 |
| $a_6$ | 3.3524E-01 | 5.5563E-02 | -7.3961E-03 | -1.8051E-02 |
| $a_8$ | -1.9705E-01 | -1.4591E-02 | 2.5066E-03 | 1.7585E-04 |
| $a_{10}$ | 4.0077E-02 | 1.2748E-03 | -1.5755E-04 | 7.2967E-04 |
| $a_{12}$ | -8.5016E-03 | -3.2001E-04 | -1.2583E-05 | -3.0763E-05 |
| $a_{14}$ | 2.6727E-03 | 8.8491E-05 | -8.0985E-06 | 1.1286E-06 |
| $a_{16}$ | 2.2796E-03 | 1.7202E-05 | 1.6290E-06 | -2.1803E-06 |

FIG. 37

| \multicolumn{7}{c}{EFL(Effective focus length)= 1.527mm, HFOV(Half angular field of view)= 102deg., Image height=2.234mm, System length=14.526mm, Fno=2.095} |||||||
|---|---|---|---|---|---|---|---|
| Surface # | | Radius | Thickness | Refractive index | Abbe number | Focus | Material |
| - | Object | 10000 | 10000 | | | | |
| 911 | 1st lens element | 14.624 | 1.797_T1 | 1.729_n1 | 54.674_v1 | -3.714_f1 | glass |
| 912 | | 2.173 | 2.696_G12 | | | | |
| 921 | 2nd lens element | -3.640 | 2.804_T2 | 1.642_n2 | 22.409_v2 | 14.089_f2 | plastic |
| 922 | | -3.389 | 0.964_G2A | | | | |
| 900 | Aperture stop | 0.000 | -0.123_TA | | | | |
| 931 | 3rd lens element | 2.262 | 2.231_T3 | 1.531_n3 | 55.745_v3 | 2.326_f3 | plastic |
| 932 | | -1.802 | 0.131_G34 | | | | |
| 941 | 4th lens element | -1.801 | 0.711_T4 | 1.633_n4 | 23.336_v4 | -1.742_f4 | plastic |
| 942 | | 3.346 | 0.121_G45 | | | | |
| 951 | 5th lens element | 2.524 | 1.654_T5 | 1.531_n5 | 55.745_v5 | 3.198_f5 | plastic |
| 952 | | -4.050 | 0.100_G5F | | | | |
| 961 | IR cut filter | 0.000 | 0.210_TF | 1.517_nf | 64.167 | | |
| 962 | | 0.000 | 0.360_GFC | | | | |
| 971 | Protection element | 0.000 | 0.400_TC | 1.517_nc | 64.167 | | |
| 972 | | 0.000 | 0.380_GCP | | | | |
| 980 | Image plane | 0.000 | 0.000 | | | | |

FIG. 40

| Aspherical parameters | | | | |
|---|---|---|---|---|
| Surface # | 921 | 922 | 931 | 932 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -3.6218E-03 | 4.4847E-04 | 1.1126E-03 | -8.5089E-02 |
| $a_6$ | -7.7003E-05 | 1.3719E-03 | -8.6618E-03 | 1.6158E-01 |
| $a_8$ | 3.2231E-05 | 3.5442E-04 | 1.3442E-02 | -1.0027E-01 |
| $a_{10}$ | 3.0078E-06 | -4.6575E-04 | -6.4738E-03 | 2.0562E-02 |
| $a_{12}$ | 5.2329E-06 | 2.4289E-04 | -9.2131E-03 | 3.3961E-03 |
| $a_{14}$ | -2.4635E-07 | -7.4914E-05 | 1.0984E-02 | -4.5028E-03 |
| $a_{16}$ | -5.6977E-08 | 9.6962E-06 | -3.6085E-03 | 1.4353E-03 |
| Surface # | 941 | 942 | 951 | 952 |
| K | 0.0000E+00 | 0.0000E+00 | 0.0000E+00 | 0.0000E+00 |
| $a_2$ | 0.0000E+00 | 0.0000E+00 | 0.0000E+00 | 0.0000E+00 |
| $a_4$ | -1.8654E-01 | -1.0030E-01 | -3.5171E-02 | 4.5242E-02 |
| $a_6$ | 2.9774E-01 | 7.0356E-02 | -1.5759E-03 | -1.0654E-02 |
| $a_8$ | -2.1466E-01 | -2.3059E-02 | 2.9437E-03 | -9.6867E-04 |
| $a_{10}$ | 7.7952E-02 | 4.6516E-03 | -5.1768E-04 | 6.5833E-04 |
| $a_{12}$ | -1.0115E-02 | -5.1625E-04 | -4.1557E-05 | -6.5828E-05 |
| $a_{14}$ | -7.0718E-03 | -4.0949E-05 | 9.4542E-06 | -6.6889E-07 |
| $a_{16}$ | 2.6676E-03 | 6.7973E-06 | 1.0833E-07 | -9.1738E-09 |

FIG. 41

| Embodiment | 1st | 2nd | 3rd | 4th | 5th | 6th | 7th | 8th | 9th |
|---|---|---|---|---|---|---|---|---|---|
| T1 | 0.95 | 0.98 | 1.16 | 0.97 | 1.30 | 1.56 | 0.55 | 1.08 | 1.80 |
| G12 | 2.83 | 2.76 | 3.50 | 2.90 | 3.76 | 4.11 | 3.00 | 3.39 | 2.70 |
| T2 | 3.07 | 3.43 | 3.15 | 3.66 | 3.44 | 3.95 | 3.32 | 3.92 | 2.80 |
| G23 | 0.34 | 0.49 | 0.86 | 0.50 | 0.38 | 1.65 | 1.44 | 1.26 | 0.84 |
| T3 | 3.03 | 2.58 | 2.56 | 2.60 | 2.51 | 2.46 | 2.07 | 2.58 | 2.23 |
| G34 | 0.21 | 0.15 | 0.15 | 0.15 | 0.15 | 0.21 | 0.15 | 0.18 | 0.13 |
| T4 | 0.82 | 0.78 | 0.75 | 0.79 | 0.62 | 1.10 | 0.84 | 0.80 | 0.71 |
| G45 | 0.15 | 0.15 | 0.12 | 0.15 | 0.28 | 0.40 | 0.12 | 0.22 | 0.12 |
| T5 | 1.86 | 1.81 | 1.83 | 1.91 | 1.78 | 1.65 | 1.55 | 1.41 | 1.65 |
| G5F | 0.10 | 0.1 | 0.1 | 0.1 | 0.1 | 0.1 | 0.1 | 0.1 | 0.1 |
| TF | 0.21 | 0.21 | 0.21 | 0.21 | 0.21 | 0.21 | 0.21 | 0.21 | 0.21 |
| GFC | 0.45 | 0.45 | 0.2416 | 0.3442 | 0.45 | 0.5 | 0.45 | 0.3624 | 0.36 |
| TC | 0.4 | 0.4 | 0.4 | 0.4 | 0.4 | 0.4 | 0.4 | 0.4 | 0.4 |
| GCP | 0.15 | 0.16 | 0.1 | 0.1 | 0.2759 | 0.06 | 0.30 | 0.1 | 0.38 |
| ALT | 9.73 | 9.58 | 9.44 | 9.92 | 9.66 | 10.73 | 8.32 | 9.79 | 9.20 |
| AAG | 3.53 | 3.55 | 4.64 | 3.70 | 4.57 | 6.36 | 4.70 | 5.05 | 3.79 |
| v1 | 28.32 | 28.32 | 28.32 | 28.32 | 28.32 | 54.67 | 54.67 | 54.67 | 54.67 |
| v2 | 55.75 | 55.75 | 55.75 | 55.75 | 55.75 | 55.75 | 55.75 | 55.75 | 22.41 |
| G12/G23 | 8.32 | 5.62 | 4.05 | 5.82 | 9.88 | 2.50 | 2.08 | 2.68 | 3.21 |
| G23/(G34+T4) | 0.33 | 0.53 | 0.96 | 0.53 | 0.49 | 1.25 | 1.47 | 1.29 | 1.00 |
| T2/T3 | 1.01 | 1.33 | 1.23 | 1.41 | 1.37 | 1.60 | 1.61 | 1.52 | 1.26 |
| T2/T5 | 1.65 | 1.89 | 1.72 | 1.92 | 1.93 | 2.40 | 2.14 | 2.78 | 1.70 |
| AAG/G34 | 17.00 | 23.45 | 30.47 | 24.32 | 30.85 | 30.35 | 32.12 | 28.62 | 29.01 |
| ALT/G12 | 3.43 | 3.47 | 2.70 | 3.42 | 2.57 | 2.61 | 2.77 | 2.89 | 3.41 |
| G12/T1 | 3.00 | 2.80 | 3.02 | 3.00 | 2.90 | 2.63 | 5.41 | 3.13 | 1.50 |
| T1/G23 | 2.78 | 2.01 | 1.34 | 1.94 | 3.41 | 0.95 | 0.38 | 0.86 | 2.14 |
| T2/G23 | 9.01 | 6.99 | 3.64 | 7.35 | 9.05 | 2.40 | 2.30 | 3.10 | 3.33 |
| T4/G23 | 2.40 | 1.58 | 0.87 | 1.59 | 1.64 | 0.67 | 0.58 | 0.63 | 0.85 |
| AAG/G23 | 10.37 | 7.23 | 5.36 | 7.42 | 12.00 | 3.87 | 3.26 | 4.00 | 4.50 |
| |v1-v2| | 27.42 | 27.42 | 27.42 | 27.42 | 27.42 | 1.07 | 1.07 | 1.07 | 32.26 |

FIG. 42

OPTICAL IMAGING LENS

RELATED APPLICATION

This application claims priority from P.R.C. Patent Application No. 201510485614.8, filed on Aug. 10, 2015, the contents of which are hereby incorporated by reference in their entirety for all purposes.

TECHNICAL FIELD

The present disclosure relates to an optical imaging lens, and particularly, relates to an optical imaging lens having five lens elements.

BACKGROUND

Market demands for improved product specifications increase every day. In parallel, new developments for mobile devices as well as their critical part, such as an optical imaging lens, are diversified into various applications. For example, cameras may be used for taking a photograph or film, watchdog for environmental monitoring, event data recorders, reversing camera systems mounted on motor vehicles, etc. It may be desirable to achieve better imaging quality to better present details in recorded frames—particularly framed recorded in environments with insufficient light or recorded during movement (e.g. driving). It may also be desirable to provide an optical imaging lens which is contact and occupies little space. Such devices may require a wide view angle and/or a low focus number (Fno)—two features which may advantageously be provided by optical imaging lens of the present disclosure.

Size reductions of an optical imaging lens cannot be achieved simply by proportionally shrinking the size of each element therein. Various aspects of the optical imaging lens, such as production difficulty, yield, material property, etc. should be taken into consideration. Therefore, production of a size-reduced optical imaging lens presents higher technical barriers and challenges than that of a conventional lens. Accordingly, achieving good optical characteristics in view of the various relevant considerations and technical barriers is a challenge in the industry.

SUMMARY

Embodiments of the present disclosure provides for various optical imaging lenses. By controlling the convex or concave shape of the surfaces and at least one inequality, the view angle of the optical imaging lens may be broadened while maintaining good optical characteristics and system functionality.

Embodiments of the present disclosure may also provide for an optical imaging lens wherein the focus number of the optical imaging lens is lowered by controlling the convex or concave shape of the surfaces and at least one inequality.

Embodiments of the present disclosure may also provide for an optical imaging lens wherein the length of the optical imaging lens is shortened by controlling the convex or concave shape of the surfaces and at least one inequality.

In some embodiments, an optical imaging lens may comprise, sequentially from an object side to an image side along an optical axis, first, second, third, fourth and fifth lens elements. Each of the first, second, third, fourth and fifth lens elements may have a refractive index, an object-side surface facing toward the object side, and an image-side surface facing toward the image side.

In the specification, parameters used here are: a central thickness of the first lens element, represented by T1, an air gap between the first lens element and the second lens element along the optical axis, represented by G12, a central thickness of the second lens element, represented by T2, an air gap between the second lens element and the third lens element along the optical axis, represented by G23, the distance between the image-side surface of the second lens element and the aperture stop along the optical axis, represented by G2A, the distance between the aperture stop and the object-side surface of the next lens element along the optical axis, represented by TA (negative sign represents the direction of the distance is from the image side to the object side), a central thickness of the third lens element, represented by T3, an air gap between the third lens element and the fourth lens element along the optical axis, represented by G34, a central thickness of the fourth lens element, represented by T4, an air gap between the fourth lens element and the fifth lens element along the optical axis, represented by G45, a central thickness of the fifth lens element, represented by T5, a distance between the image-side surface of the fifth lens element and the object-side surface of a filtering unit along the optical axis, represented by G5F, a central thickness of the filtering unit along the optical axis, represented by TF, a distance between the image-side surface of the filtering unit and a protection element along the optical axis, represented by GFC, a central thickness of the protection element along the optical axis, represented by TC, a distance between the image-side surface of a protection element and an image plane along the optical axis, represented by GCP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, the refractive index of the filtering unit, represented by nf, the refractive index of the protection element, represented by nc, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the filtering unit, represented by vf, an abbe number of the protection element, represented by vc, an effective focal length of the optical imaging lens, represented by EFL or f, a distance between the object-side surface of the first lens element and an image plane along the optical axis, represented by TTL, a sum of the central thicknesses of all five lens elements, i.e. a sum of T1, T2, T3, T4 and T5, represented by ALT, a sum of all four air gaps from the first lens element to the fifth lens element along the optical axis, i.e. a sum of G12, G23, G34 and G45, represented by AAG, and a back focal length of the optical imaging lens, which is defined as the distance from the image-side surface of the fifth lens element to the image plane along the optical axis, i.e. a sum of G5F, TF, GFC, TC and GCP, and represented by BFL. Please note that G23 equals to G2A+TA.

In an aspect of the present disclosure, in the optical imaging lens, the first lens element may have a negative refractive index, the object-side surface thereof may comprise a convex portion in a vicinity of the optical axis, the second lens element may have positive refractive index, the object-side surface thereof may comprise a concave portion in a vicinity of the optical axis, the object-side surface of the third lens element may comprise a convex portion in a vicinity of the optical axis, the object-side surface of the fourth lens element may comprise a concave portion in a vicinity of the optical axis, the object-side surface of the fifth lens element may comprise a convex portion in a vicinity of the optical axis, the optical imaging lens may comprise no other lenses having refractive index beyond the five lens elements, and an air gap between the first lens element and the second lens element along the optical axis is represented by G12, an air gap between the second lens element and the third lens element along the optical axis is represented by G23, and G12 and G23 satisfy the inequality:

$$G12/G23 \geq 2.05 \qquad \text{Inequality (1).}$$

In another aspect of the present disclosure, in the optical imaging lens, the first lens element may have negative refractive index, the object-side surface thereof may comprise a convex portion in a vicinity of the optical axis, the object-side surface of the second lens element may comprise a concave portion in a vicinity of the optical axis, the object-side surface of the third lens element may comprise a convex portion in a vicinity of the optical axis, the object-side surface of the fourth lens element may comprise a concave portion in a vicinity of the optical axis, the object-side surface of the fifth lens element may comprise a convex portion in a vicinity of the optical axis, and the image-side surface of the fifth lens element may comprise a convex portion in a vicinity of a periphery of the fifth lens element, the optical imaging lens may comprise no other lenses having refractive index beyond the five lens elements, and an air gap between the first lens element and the second lens element along the optical axis is represented by G12, an air gap between the second lens element and the third lens element along the optical axis is represented by G23, and G12 and G23 satisfy Inequality (1).

In another exemplary embodiment, other inequality(s), such as those relating to the ratio among parameters could be taken into consideration. For example:

$$10 \geq G12/G23 \geq 2.05 \qquad \text{Inequality (1');}$$

$$G23/(G34+T4) \geq 0.53 \qquad \text{Inequality (2);}$$

$$T2/T3 \geq 1 \qquad \text{Inequality (3);}$$

$$T2/T5 \geq 1.65 \qquad \text{Inequality (4);}$$

$$AAG/G34 \geq 17 \qquad \text{Inequality (5);}$$

$$ALT/G12 \geq 2.7 \qquad \text{Inequality (6);}$$

$$G12/T1 \leq 3 \qquad \text{Inequality (7);}$$

$$T1/G23 \leq 3.4 \qquad \text{Inequality (8);}$$

$$T2/G23 \leq 9 \qquad \text{Inequality (9);}$$

$$T4/G23 \leq 2.4 \qquad \text{Inequality (10);}$$

$$AAG/G23 \leq 12 \qquad \text{Inequality (11); and/or}$$

$$|v1-v2| \geq 15 \qquad \text{Inequality (12).}$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. It is noted that the details listed here could be incorporated in example embodiments if no inconsistency occurs.

Through controlling the convex or concave shape of the surfaces and at lease one inequality, the optical imaging lens in exemplary embodiments achieve good optical characteristics and effectively broaden the view angle of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of one single lens element according to the present disclosure;

FIG. 2 is a cross-sectional view showing the relation between the shape of a portion and the position where a collimated ray meets the optical axis;

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of a seventh embodiment of an optical imaging lens according to the present disclosure;

FIG. 33 is a table of aspherical data of a seventh embodiment of the optical imaging lens according to the present disclosure;

FIG. 36 is a table of optical data for each lens element of the optical imaging lens of an eighth embodiment of the present disclosure;

FIG. 37 is a table of aspherical data of an eighth embodiment of the optical imaging lens according to the present disclosure;

FIG. 40 is a table of optical data for each lens element of the optical imaging lens of a ninth embodiment of the present disclosure;

FIG. 41 is a table of aspherical data of a ninth embodiment of the optical imaging lens according to the present disclosure;

FIG. 42 is a table for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of all nine example embodiments;

DETAILED DESCRIPTION

Figure 3:
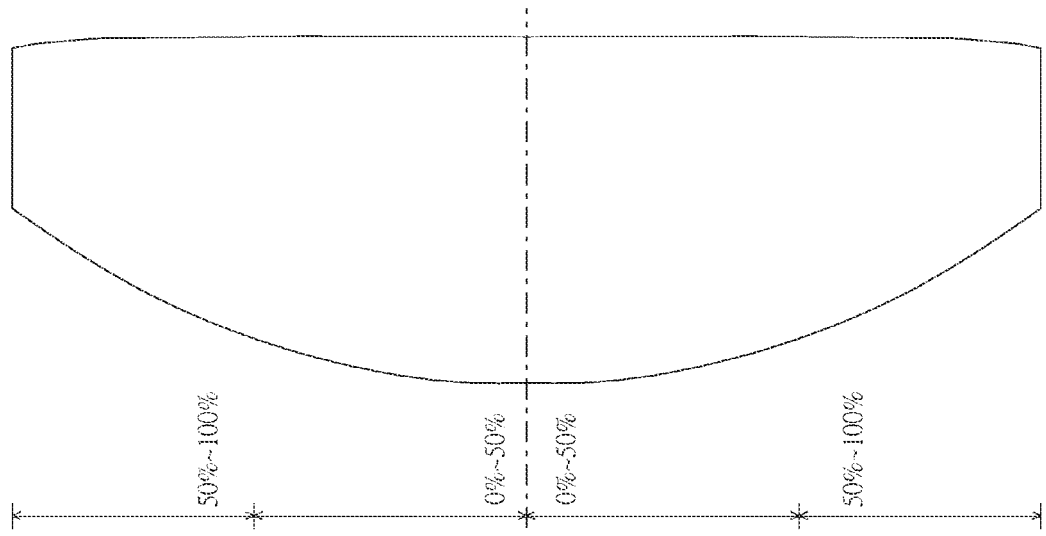
FIG. 3 is a cross-sectional view showing the relation between the shape of a portion and he effective radius of a first example.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refractive index (or negative refractive index)" may mean that the paraxial refractive index of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a portion in a vicinity of the optical axis", and the region C of the lens element is defined as "a portion in a vicinity of a periphery of the lens element." Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave may depend on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion may be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, another way to determine whether a portion in a vicinity of the optical axis has a convex or concave shape by referring to the sign of an "R" value, which is the (paraxial) radius of curvature of a lens surface. The R value may be used in optical design software such as Zemax and CodeV. The R value may appear in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For cases with no transition points, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, may appear within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element may be different from the shape of the portion in a vicinity of the optical axis; the portion in a vicinity of a periphery of the lens element has a convex shape.

Figure 4:
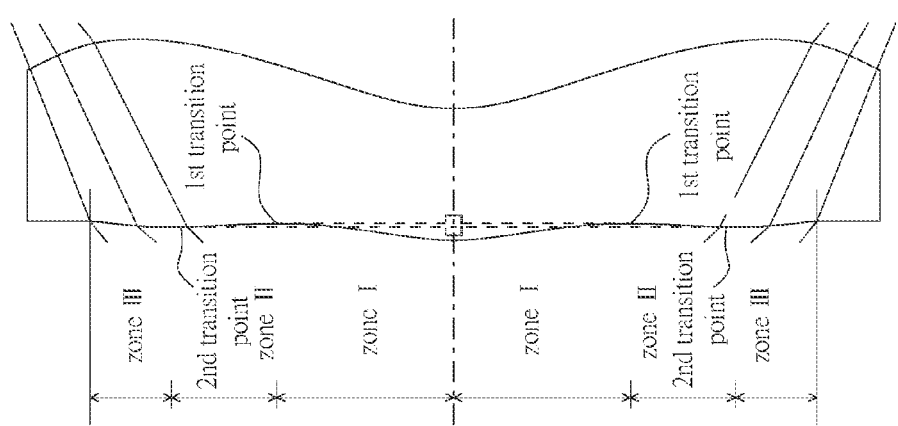
FIG. 4 is a cross-sectional view showing the relation between the shape of a portion and he effective radius of a second example.

Referring to the second example depicted in FIG. 4, a first transition point and a second transition point may exist on the object-side surface (within the clear aperture) of a lens element. As depicted in FIG. 4, portion I may be the portion in a vicinity of the optical axis, and portion III may be the portion in a vicinity of a periphery of the lens element. The portion in a vicinity of the optical axis may have a convex shape because the R value at the object-side surface of the lens element is positive. The portion in a vicinity of a periphery of the lens element (portion III) may have a convex shape. What is more, there is another portion having a concave shape existing between the first and second transition point (portion II).

Figure 5:
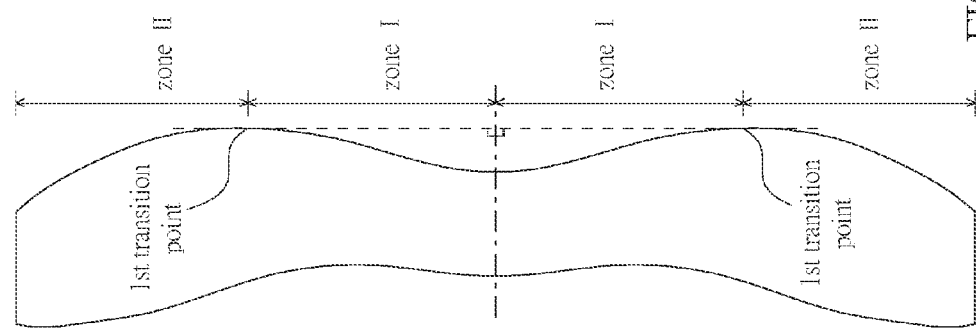
FIG. 5 is a cross-sectional view showing the relation between the shape of a portion and he effective radius of a third example.

Referring to a third example depicted in FIG. 5, no transition point may exist on the object-side surface of the lens element. In this case, the portion between 0~50% of the effective radius (radius of the clear aperture) may be determined as the portion in a vicinity of the optical axis, and the portion between 50~100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

In the present disclosure, examples of an optical imaging lens which may be a prime lens are provided. Example embodiments of an optical imaging lens may comprise a first lens element, a second lens element, a third lens element, a fourth lens element and a fifth lens element, each of the lens elements may comprise a refractive index, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refractive index beyond the five lens elements.

The lens elements may be designed in light of the optical characteristics and the view angle of the optical imaging lens. For example, configuring the first lens element having negative refractive index may assist in collecting light with high incident angle and lower the focus number of the optical imaging lens; configuring the second lens element having positive refractive index may assist in adjusting all kinds of aberrations generated by the negative refractive index of the first lens element; arranging the aperture stop between the second and third lens elements may assist in enlarging the view angle. Further with details in shape of the lens elements, such as the convex portion in a vicinity of the optical axis formed on the object-side surface of the first lens element, the concave portion in a vicinity of the optical axis formed on the object-side surface of the second lens element, the convex portion in a vicinity of the optical axis formed on the object-side surface of the third lens element, the concave portion in a vicinity of the optical axis formed on the object-side surface of the fourth lens element, and the convex portion in a vicinity of the optical axis formed on the object-side surface of the fifth lens element, the curvature of field and distortion may be eliminated and the image aberration may be adjusted effectively to promote the imaging quality of the optical imaging lens.

Additionally, small AAG or a small air gap may assist in shortening the length of the optical imaging lens. The value of G12/G23 may satisfy Inequality (1), and more preferably, the values of G23/(G34+T4), AAG/G34 and AAG/G23 may optionally satisfy Inequality (2), Inequality (5) or Inequality (11) to practically configure an optical imaging lens with good optical characters, a broad view angle as well as a short length. Preferably, the value of G12/G23 may be within 2.05~10, the value of G23/(G34+T4) may be within 0.53~1.5, the value of AAG/G34 may be within 17~35 and the value of AAG/G23 may be within 3.2~12.

To shorten the length of the optical imaging lens, which may present difficulties in assembling the optical imaging lens, the optical imaging lens may be better configured with at lease one thin lens element. The values of T2/T3 and T2/T5 may optionally satisfy Inequality (3) or Inequality (4) to practically configure an optical imaging lens with good optical characters, a broad view angle as well as a short length. In some embodiments, the value of T2/T3 may be within 1~1.7, and the value of T2/T5 may be within 1.65~2.8.

As mentioned above, arranging thickness of a lens element and the distance of an air gap may assist in achieving good image quality as well as a short length. Here, the values of ALT/G12, G12/T1, T1/G23, T2/G23, T4/G23 may optionally satisfy Inequality (6), Inequality (7), Inequality (8), Inequality (9) or Inequality (10) to practically configure an optical imaging lens with good optical characters, a broad view angle and a short length. Preferably, the value of ALT/G12 may be within 2.7~3.6, the value of G12/T1 may be within 1.5~3, the value of T1/G23 may be within 0.35~3.4, the value of T2/G23 may be within 2.3~9, and the value of T4/G23 may be within 0.55~2.4.

Additionally, differences in the abbe numbers of two lens elements may be utilized for controlling optical characters of the optical imaging lens. The value of |v1−v2| may optionally satisfy Inequality (12), and preferably the value of |v1−v2| may be within 15~35.

In light of the unpredictability in an optical system, in the present disclosure, by controlling the convex or concave shape of the surfaces and satisfying at least one of the inequalities listed above may preferably enlarging the view angle of the optical imaging lens as well as achieving good optical characteristics, and preferably, lowering the f-number, shortening the length of the optical imaging lens, promoting the imaging quality and/or increasing the yield in the assembly process.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 6:
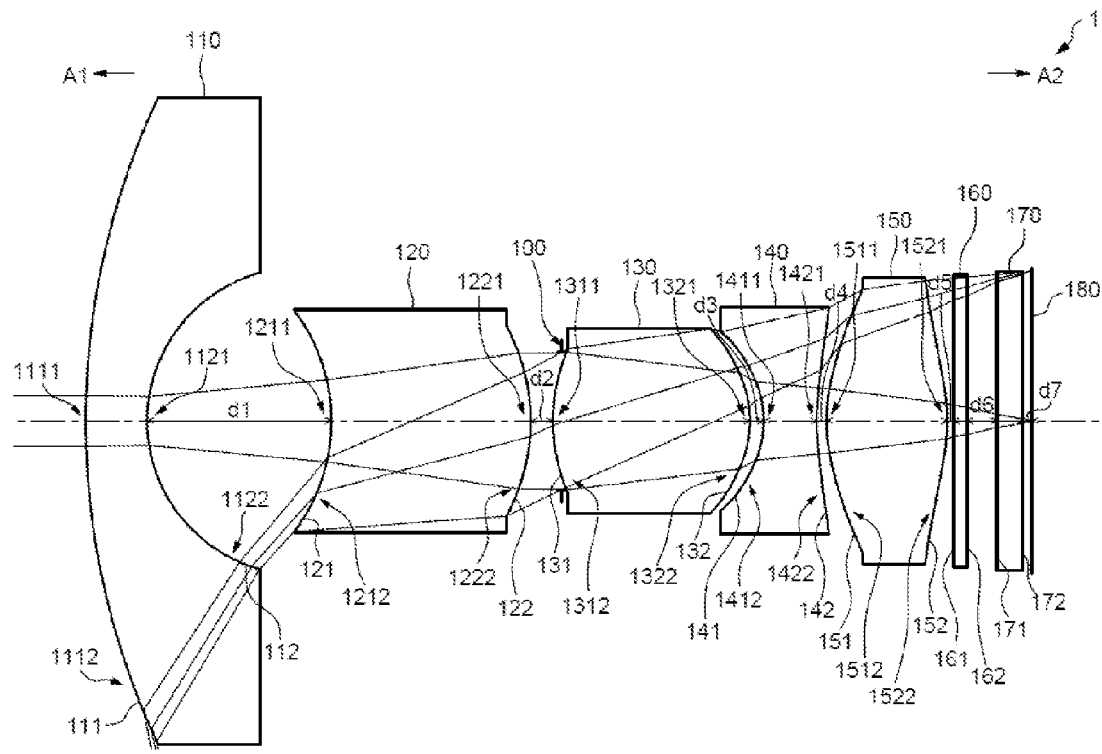
FIG. 6 is a cross-sectional view of a first embodiment of an optical imaging lens having five lens elements according to the present disclosure.
Figure 7:
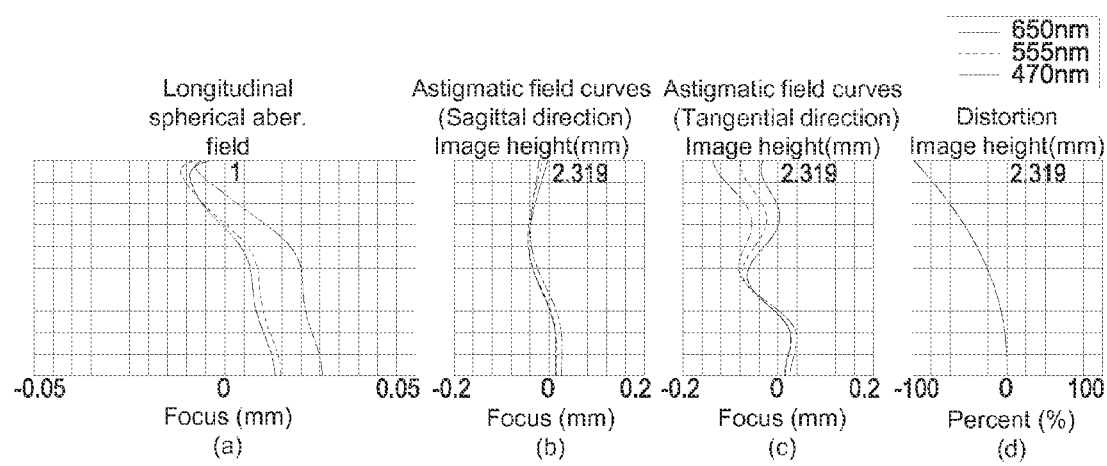
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics, a large view angle and a small focus number. Reference is now made to FIGS. 6-9. FIG. 6 illustrates an example cross-sectional view of an optical imaging lens 1 having five lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment, in which f is used for representing EFL. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, a second lens element 120, an aperture stop 100, a third lens element 130, a fourth lens element 140 and a fifth lens element 150. Here, the optical imaging lens 1 of the example embodiment may be packaged in a chip scale package (CSP), in which a protection element 170 is positioned between a filtering unit 160 and an image plane 180 of an image sensor; however, the package type of an optical imaging lens according to the disclosure is not limited to this specific type, in some embodiment, an optical imaging lens may be packaged in a chip on board (COB) package, which does not require a protection element before an image sensor. Thus, behind the fifth lens element 150, the filtering unit 160, the protection element 170 and the image plane 180 may be sequentially positioned at the image side A2 of the optical lens 1. The protection element 170 may be implemented by a cover glass. Each of the first, second, third, fourth, fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The example embodiment of the filtering unit 160 which may selectively absorb light with specific wavelength from the light passing optical imaging lens 1 is an IR cut filter (infrared cut filter). Then, IR light may be absorbed, and this may prohibit the IR light, which is not seen by human eyes, from producing an image on the image plane 180.

Please noted that during the normal operation of the optical imaging lens 1, the distance between any two adjacent lens elements of the first, second, third, fourth and fifth lens elements 110, 120, 130, 140, 150 may be an unchanged value, i.e. the optical imaging lens 1 may be a prime lens.

Exemplary embodiments of each lens element of the optical imaging lens 1 which may be constructed by plastic material, glass material, or other transparent material will now be described with reference to the drawings.

An example embodiment of the first lens element 110, constructed by glass material, may have a negative refractive index. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, constructed by plastic material, may have a positive refractive index. The object-side surface 121 may have a concave surface comprising a concave portion 1211 in a vicinity of the optical axis and a concave portion 1212 in a vicinity of a periphery of the second lens element 120. The image-side surface 122 may be a convex surface comprising a convex portion 1221 in a vicinity of the optical axis and a convex portion 1222 in a vicinity of the periphery of the second lens element 120.

An example embodiment of the third lens element 130, constructed by plastic material, may have a positive refractive index. The object-side surface 131 may be a convex surface comprising a convex portion 1311 in a vicinity of the optical axis and a convex portion 1312 in a vicinity of a periphery of the third lens element 130. The image-side surface 132 may be a convex surface comprising a convex portion 1321 in a vicinity of the optical axis and a convex portion 1323 between the vicinity of the optical axis and the vicinity of the periphery of the third lens element 130.

An example embodiment of the fourth lens element 140, constructed by plastic material, may have a negative refractive index. The object-side surface 141 may be a concave surface comprising a concave portion 1411 in a vicinity of the optical axis and a concave portion 1412 in a vicinity of a periphery of the fourth lens element 140. The image-side surface 142 may be a concave surface comprising a concave portion 1421 in a vicinity of the optical axis and a concave portion 1422 in a vicinity of the periphery of the fourth lens element 140.

An example embodiment of the fifth lens element 150, constructed by plastic material, may have a positive refractive index. The object-side surface 151 may be a convex surface comprising a convex portion 1511 in a vicinity of the optical axis and a convex portion 1512 in a vicinity of a periphery of the fifth lens element 150. The image-side surface 152 may be a convex surface comprising a convex portion 1521 in a vicinity of the optical axis and a convex portion 1522 in a vicinity of the periphery of the fifth lens element 150.

In example embodiments, air gaps may exist between the lens elements 110, 120, 130, 140, 150, the filtering unit 160, the protection element 170 and the image plane 180 of the image sensor. For example, FIG. 6 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160 and the air gap d6 existing between the filtering unit 160 and the protection element 170, and the air gap d7 existing between the protection element 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, and the sum of d1, d2, d3 and d4 is denoted by AAG.

FIG. 8 depicts the optical characteristics of each lens elements in the optical imaging lens 1 of the present embodiment, and please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 111 of the first lens element 110 to the image plane 180 along the optical axis may be about 14.570 mm, the image height may be about 2.319 mm, half field of view (HFOV) may be about 102 degrees, Fno may be about 2.10. Please note that the view angle of the optical imaging lens 1 may be twice of HFOV, i.e. as broad as about 204 degrees. Thus, the optical imaging lens 1 may be capable to provide a large view angle.

The aspherical surfaces, including the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, may all be defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 9. The object-side surface 111 and the image-side surface 112 of the first lens element 110 may both be spherical surfaces.

Please refer to FIG. 7 part (a), longitudinal spherical aberration of the optical imaging lens in the present embodiment is shown in the coordinate in which the horizontal axis represents focus and the vertical axis represents field of view, and FIG. 7 part (b), astigmatism aberration of the optical imaging lens in the present embodiment in the sagittal direction is shown in the coordinate in which the horizontal axis represents focus and the vertical axis represents image height, and FIG. 7 part (c), astigmatism aberration in the tangential direction of the optical imaging lens in the present embodiment is shown in the coordinate in which the horizontal axis represents focus and the vertical axis represents image height, and FIG. 7 part (d), distortion aberration of the optical imaging lens in the present embodiment is shown in the coordinate in which the horizontal axis represents percentage and the vertical axis represents image height. The curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.03 mm. Therefore, the present embodiment may improve the longitudinal spherical aberration with respect to different wavelengths. For astigmatism aberration in the sagittal direction, the focus variation with respect to the three wavelengths in the whole field may fall within about ±0.06 mm, for astigmatism aberration in the tangential direction, the focus variation with respect to the three wavelengths in the whole field may fall within about ±0.14 mm, and the variation of the distortion aberration may be within about ±100%. However, because event data recorders or reversing camera systems mounted on motor vehicles may identify coming object(s) near the motor vehicles in an image with high distortion aberration, the distortion aberration as high as about ±100% may be acceptable.

Therefore, the optical imaging lens 1 of the present embodiment shows good optical characters to meet the requirements of the imaging quality. According to above illustration, the optical imaging lens 1 of the example embodiment, which may be capable to provide about 102 degrees in HFOV, about 2.10 in Fno and about 14.570 mm in length, indeed achieves great optical performance and the view angle of the optical imaging lens 1 may effectively be broadened.

Figure 10:
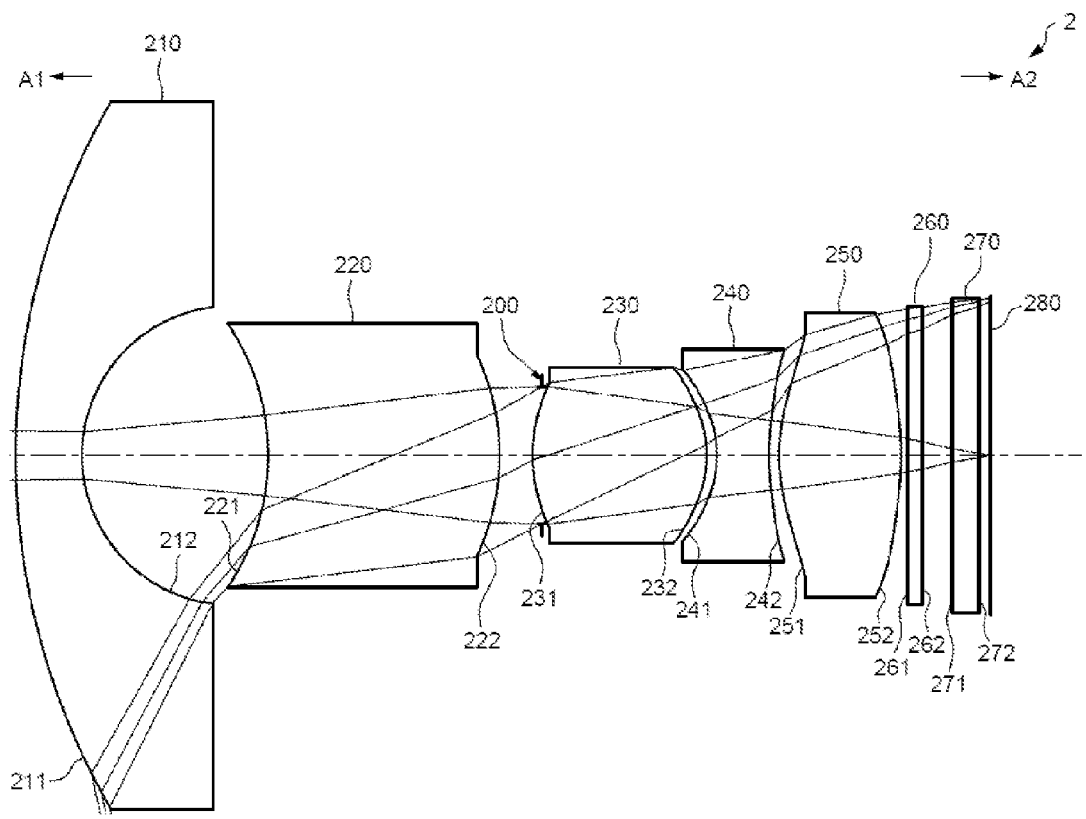
FIG. 10 is a cross-sectional view of a second embodiment of an optical imaging lens having five lens elements according to the present disclosure.
Figure 11:
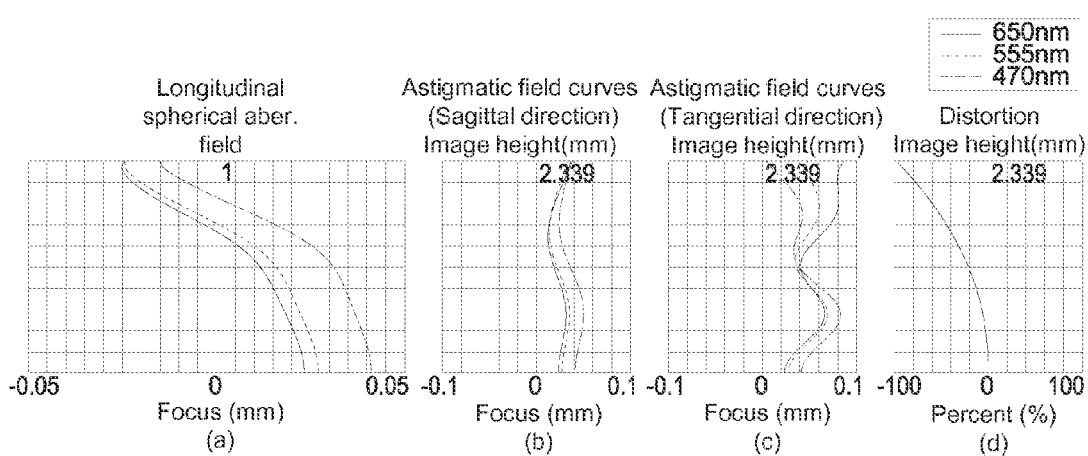
FIG. 11 is a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having five lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, an aperture stop 200, a third lens element 230, a fourth lens element 240 and a fifth lens element 250.

The differences between the second embodiment and the first embodiment may include the radius of curvature, thickness of each lens element, the distance of each air gap, aspherical data and related optical parameters, such as back focal length, but the configuration of the concave/convex shape of surfaces, comprising the object-side surfaces 211, 221, 231, 241, 251 facing to the object side A1 and the image-side surfaces 212, 222, 232, 242, 252 facing to the image side A2, are similar to those in the first embodiment. Here, for clearly showing the drawings of the present embodiment, only the surface shapes which are different from that in the first embodiment are labeled. Please refer to FIG. 12 for the optical characteristics of each lens elements in the optical imaging lens 2 the present embodiment, and please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 211 of the first lens element 210 to the image plane 280 along the optical axis may be about 14.451 mm, the image height may be about 2.339 mm, HFOV may be about 102 degrees, and Fno may be about 2.10. Thus, the optical imaging lens 2 may be capable of providing a large view angle. Please note that compared with the first embodiment, the length of the optical imaging lens 2 may be shorter.

As the longitudinal spherical aberration shown in FIG. 11 part (a), the offset of the off-axis light relative to the image point may be within about ±0.045 mm. As the astigmatism aberration in the sagittal direction shown in FIG. 11 part (b), the focus variation with respect to the three wavelengths in the whole field may fall within about ±0.06 mm. As the astigmatism aberration in the tangential direction shown in FIG. 11 part (c), the focus variation with respect to the three wavelengths in the whole field may fall within about ±0.09 mm. As shown in FIG. 11 part (d), the variation of the distortion aberration may be within about ±100%.

Compared with the first embodiment, the astigmatism aberration in the tangential direction of the optical imaging lens 2 may be less. Therefore, according to above illustration, the optical imaging lens 2 of the example embodiment, which may be capable of providing about 102 degrees in HFOV, about 2.10 in Fno and about 14.451 mm in length, may indeed achieve great optical performance.

Figure 14:
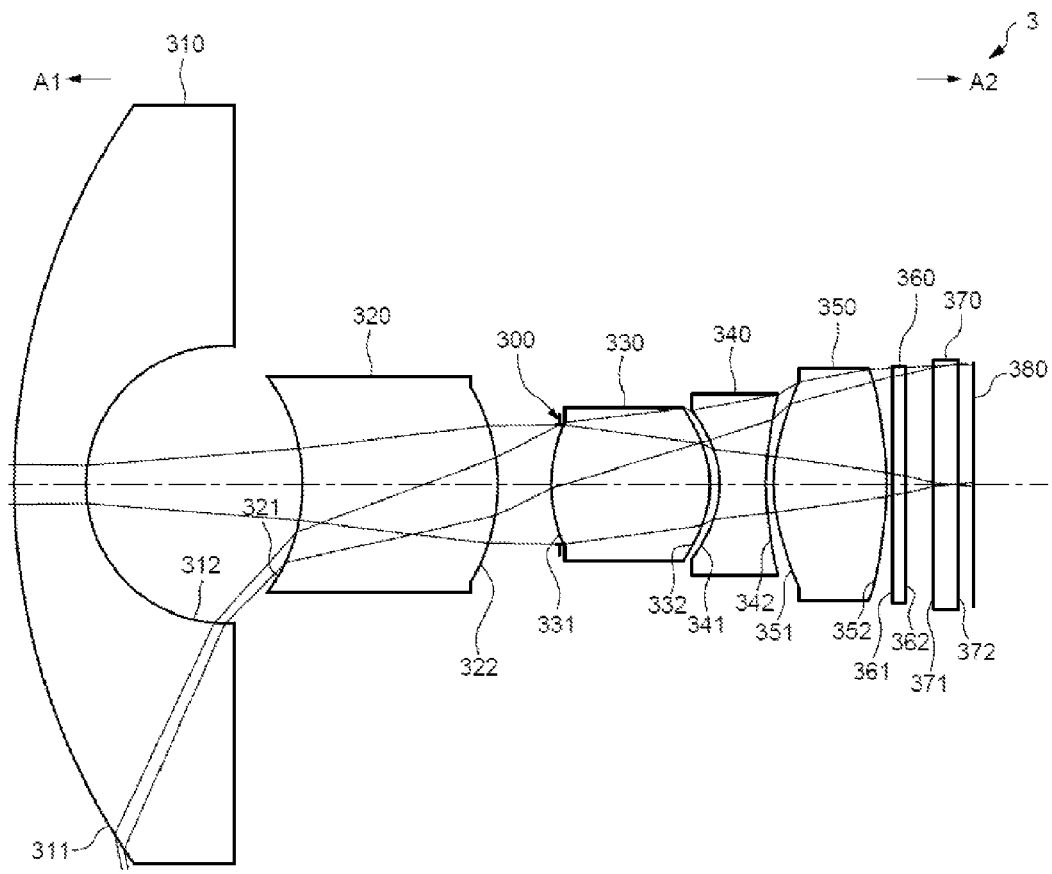
FIG. 14 is a cross-sectional view of a third embodiment of an optical imaging lens having five lens elements according to the present disclosure.
Figure 15:
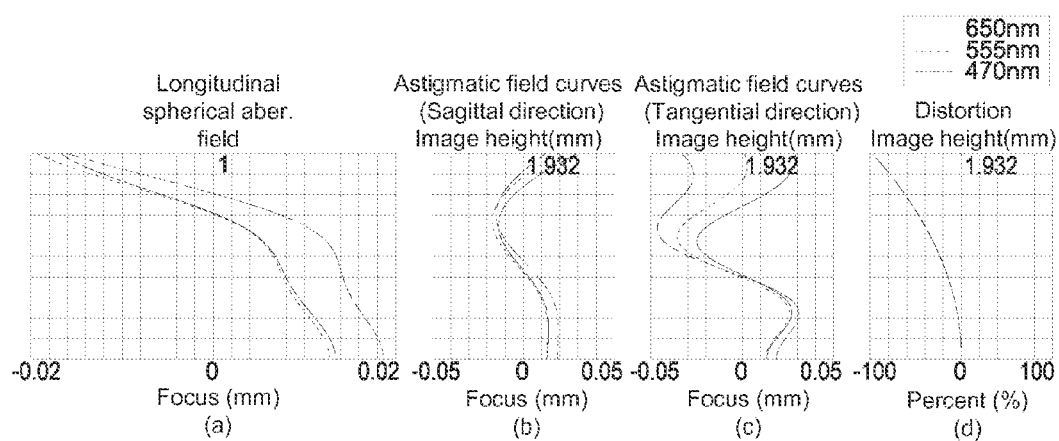
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, an aperture stop 300, a third lens element 330, a fourth lens element 340 and a fifth lens element 350.

The differences between the third embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 311, 321, 331, 341, 351 facing to the object side A1 and the image-side surfaces 312, 322, 332, 342, 352 facing to the image side A2, are similar to those in the first embodiment. Here, for clearly showing the drawings of the present embodiment, only the surface shapes which are different from that in the first embodiment are labeled. Please refer to FIG. 16 for the optical characteristics of each lens elements in the optical imaging lens 3 of the present embodiment, and please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 311 of the first lens element 310 to the image plane 380 along the optical axis may be about 15.131 mm, the image height may be about 1.932 mm, HFOV may be about 102 degrees and Fno may be about 2.10. Thus, the optical imaging lens 3 may be capable of providing a large view angle.

As the longitudinal spherical aberration shown in FIG. 15 part (a), the offset of the off-axis light relative to the image point may be within about ±0.02 mm. As the astigmatism aberration in the sagittal direction shown in FIG. 15 part (b), the focus variation with respect to the three wavelengths in the whole field may fall within about ±0.03 mm. As the astigmatism aberration in the tangential direction shown in FIG. 15 part (c), the focus variation with respect to the three wavelengths in the whole field may fall within about ±0.05 mm. As shown in FIG. 15 part (d), the variation of the distortion aberration may be within about ±100%.

Compared with the first embodiment, both the longitudinal spherical aberration and distortion aberration of the optical imaging lens 3 may be smaller. Therefore, according to above illustration, the optical imaging lens 3 of the example embodiment, which may be capable of providing about 102 degrees in HFOV, about 2.10 in Fno and about 15.131 mm in length, may provide for improved optical performance.

Figure 18:
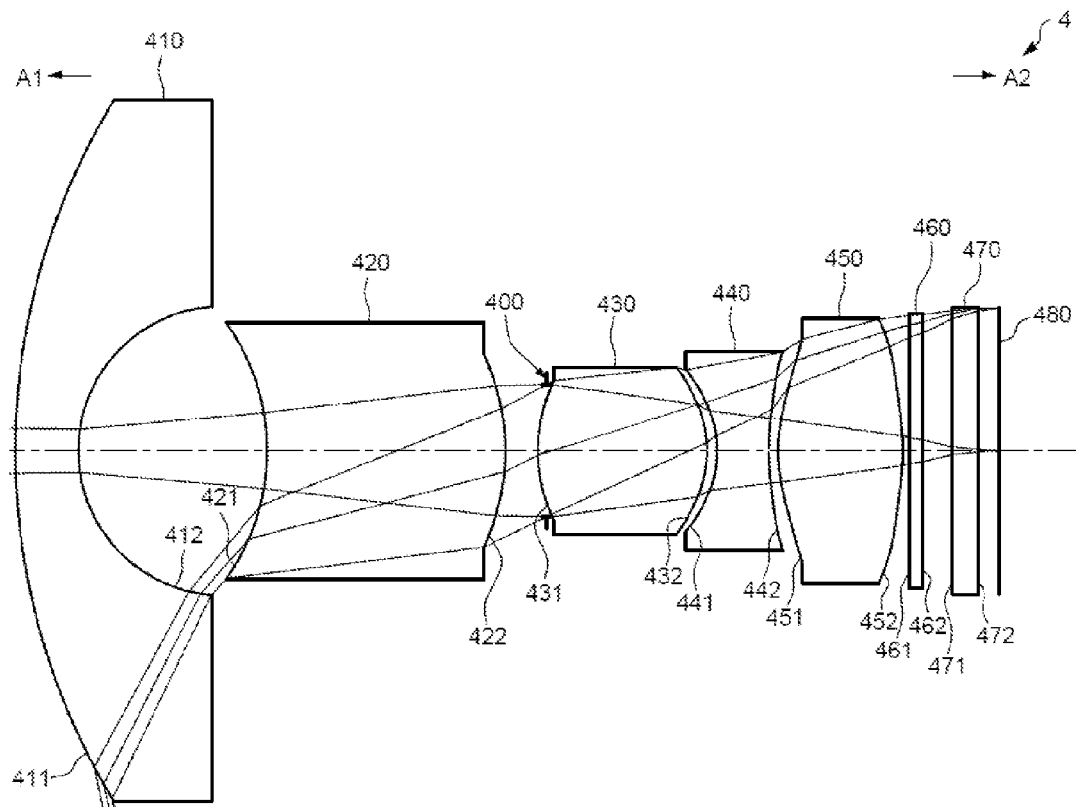
FIG. 18 is a cross-sectional view of a fourth embodiment of an optical imaging lens having five lens elements according to the present disclosure.
Figure 19:
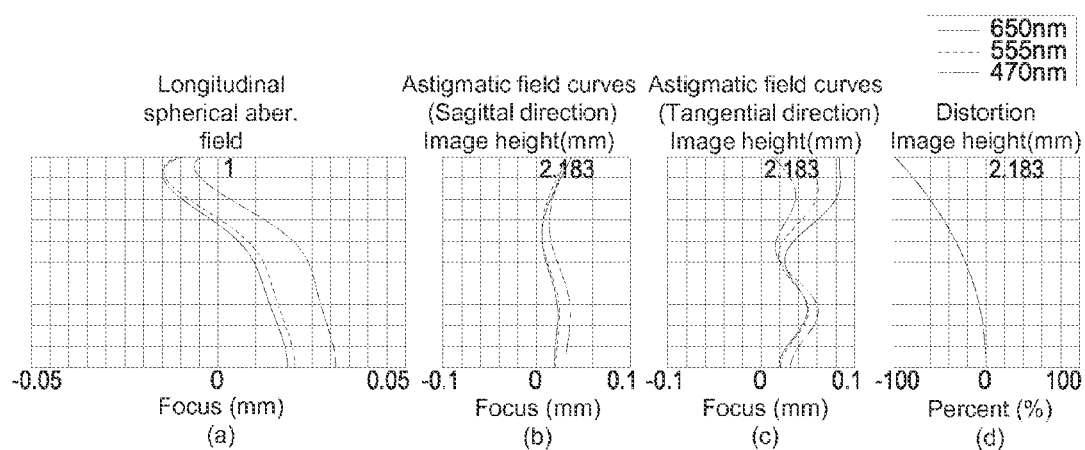
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having five lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, an aperture stop 400, a third lens element 430, a fourth lens element 44 and a fifth lens element 450.

The differences between the fourth embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 411, 421, 431, 441, 451 facing to the object side A1 and the image-side surfaces 412, 422, 432, 442, 452 facing to the image side A2, are similar to those in the first embodiment. Here, for clearly showing the drawings of the present embodiment, only the surface shapes which are different from that in the first embodiment are labeled. Please refer to FIG. 20 for the optical characteristics of each lens elements in the optical imaging lens 4 of the present embodiment, please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 411 of the first lens element 410 to the image plane 480 along the optical axis may be about 14.771 mm, the image height may be about 2.183 mm, HFOV may be about 102 degrees and Fno may be about 2.10. Thus, the optical imaging lens 4 may be capable of providing a large view angle.

As the longitudinal spherical aberration shown in FIG. 19 part (a), the offset of the off-axis light relative to the image point may be within about ±0.035 mm. As the astigmatism aberration in the sagittal direction shown in FIG. 19 part (b), the focus variation with respect to the three wavelengths in the whole field may fall within about ±0.04 mm. As the astigmatism aberration in the tangential direction shown in FIG. 19 part (c), the focus variation with respect to the three wavelengths in the whole field may fall within about ±0.09 mm. As shown in FIG. 19 part (d), the variation of the distortion aberration may be within about ±100%.

Compared with the first embodiment, the distortion aberration of the optical imaging lens 4 may be smaller. Therefore, according to above illustration, the optical imaging lens 4 of the example embodiment, which may be capable of providing about 102 degrees in HFOV, about 2.10 in Fno and about 14.771 mm in length, may provide for improved optical performance.

Figure 22:
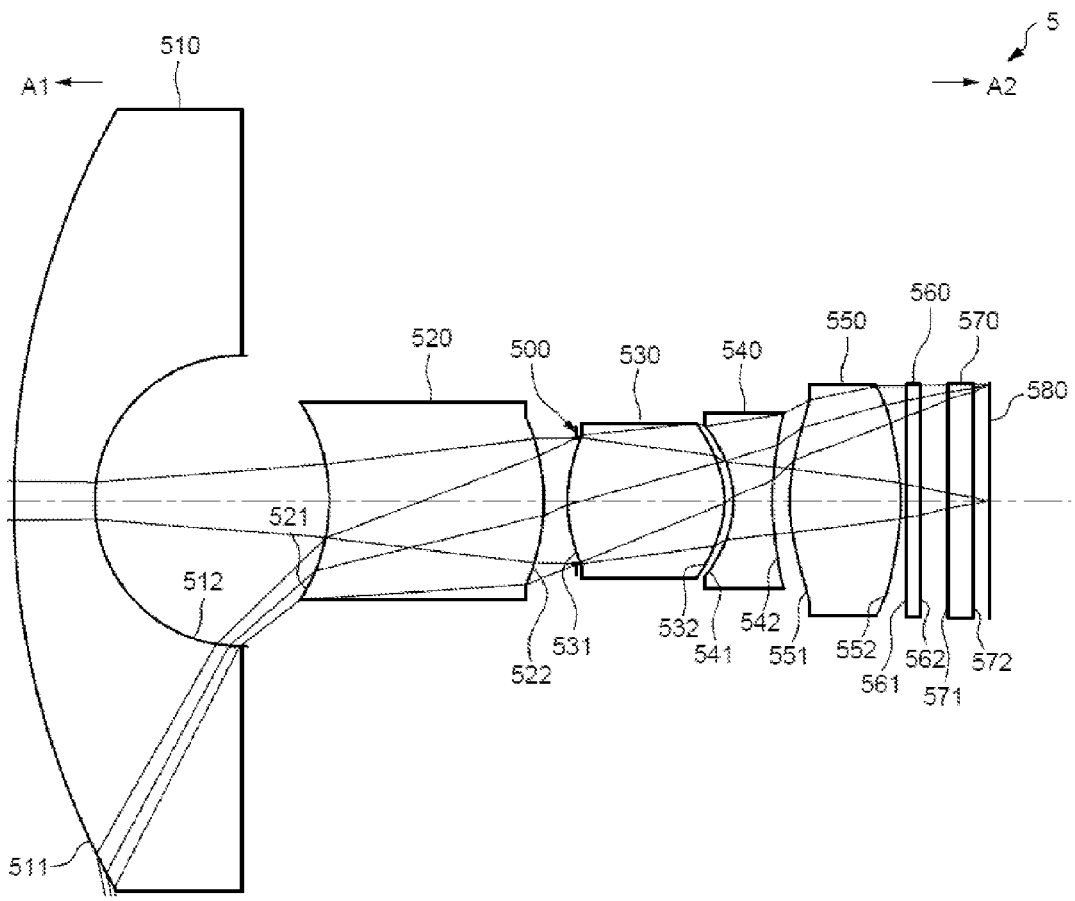
FIG. 22 is a cross-sectional view of a fifth embodiment of an optical imaging lens having five lens elements according to the present disclosure.
Figure 23:
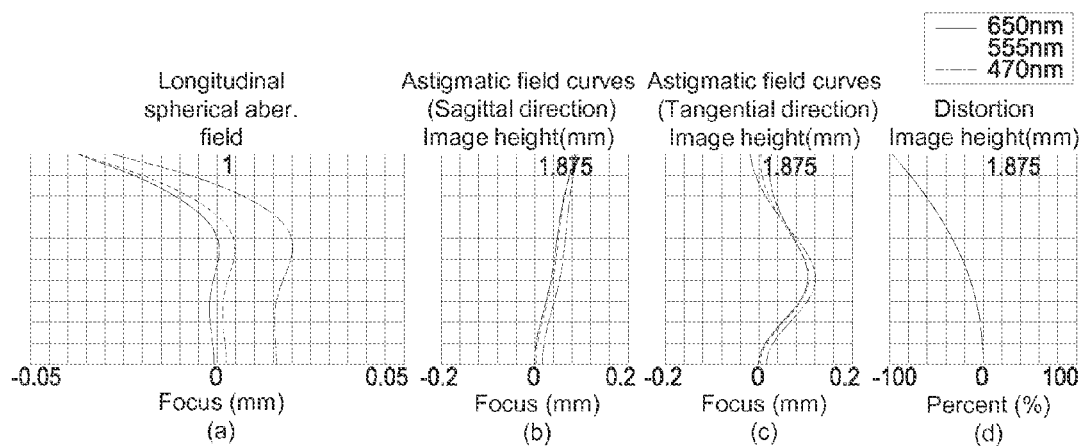
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, an aperture stop 500, a third lens element 530, a fourth lens element 540 and a fifth lens element 550.

The differences between the fifth embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 511, 521, 531, 541, 551 facing to the object side A1 and the image-side surfaces 512, 522, 532, 542, 552 facing to the image side A2, are similar to those in the first embodiment. Here, for clearly showing the drawings of the present embodiment, only the surface shapes which are different from that in the first embodiment are labeled. Please refer to FIG. 24 for the optical characteristics of each lens elements in the optical imaging lens 5 of the present embodiment, please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 511 of the first lens element 510 to the image plane 580 along the optical axis may be about 15.664 mm, the image height may be about 1.875 mm, HFOV may be about 102 degrees and Fno may be about 2.10. Thus, the optical imaging lens 5 may be capable of providing a large view angle.

As the longitudinal spherical aberration shown in FIG. 23 part (a), the offset of the off-axis light relative to the image point may be within about ±0.04 mm. As the astigmatism aberration in the sagittal direction shown in FIG. 23 part (b), the focus variation with respect to the three wavelengths in the whole field may fall within about ±0.1 mm. As the astigmatism aberration in the tangential direction shown in FIG. 23 part (c), the focus variation with respect to the three wavelengths in the whole field may fall within about ±0.14 mm. As shown in FIG. 23 part (d), the variation of the distortion aberration may be within about ±100%.

According to above illustration, the optical imaging lens 5 of the example embodiment, which may be capable of providing about 102 degrees in HFOV, about 2.10 in Fno and about 15.664 mm in length, may indeed achieve improved optical performance.

Figure 26:
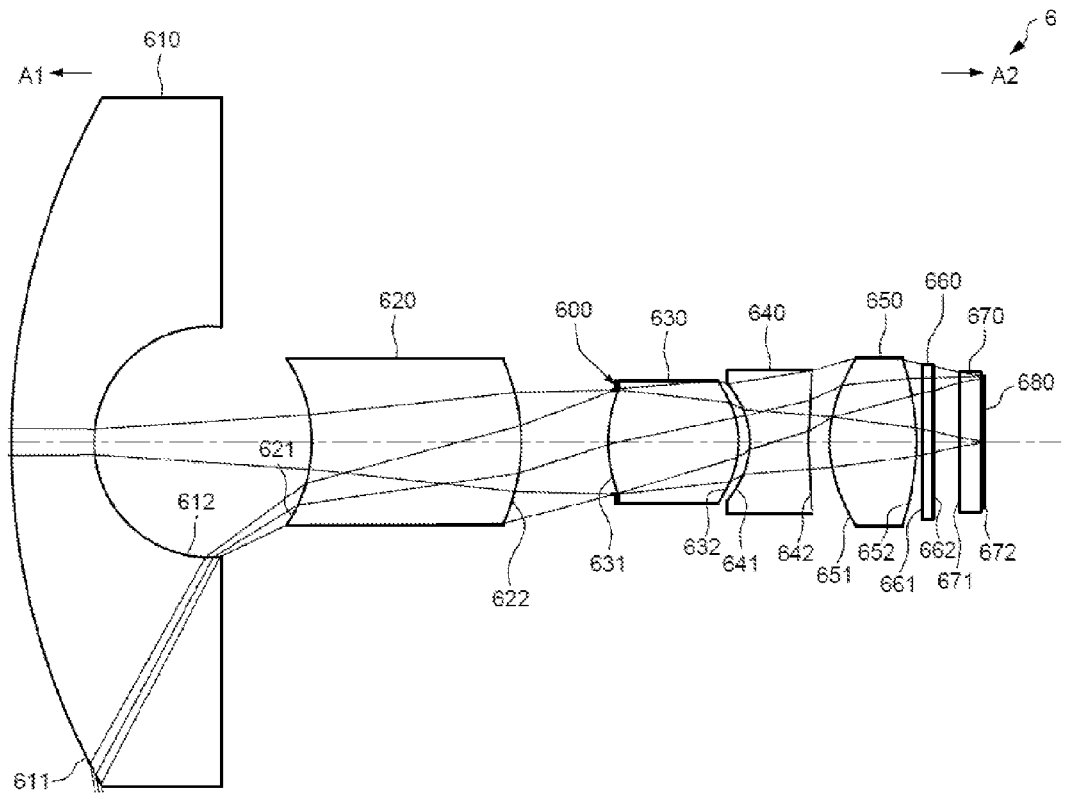
FIG. 26 is a cross-sectional view of a sixth embodiment of an optical imaging lens having five lens elements according to the present disclosure.
Figure 27:
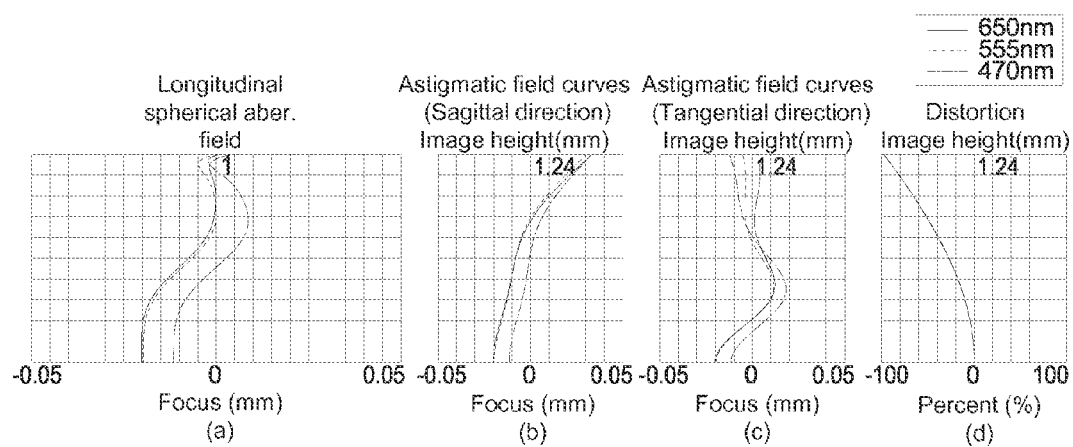
FIG. 27 is a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having five lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, an aperture stop 600, a third lens element 630, a fourth lens element 640 and a fifth lens element 650.

The differences between the sixth embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 611, 621, 631, 641, 651 facing to the object side A1 and the image-side surfaces 612, 622, 632, 642, 652 facing to the image side A2, are similar to those in the first embodiment. Here, for clearly showing the drawings of the present embodiment, only the surface shapes which are different from that in the first embodiment are labeled. Please refer to FIG. 28 for the optical characteristics of each lens elements in the optical imaging lens 6 of the present embodiment, please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 611 of the first lens element 610 to the image plane 680 along the optical axis may be about 18.361 mm, the image height may be about 1.24 mm, HFOV may be about 100 degrees and Fno may be about 2.07. Thus, the optical imaging lens 6 may be capable of providing a large view angle.

As the longitudinal spherical aberration shown in FIG. 27 part (a), the offset of the off-axis light relative to the image point may be within about +0.025 mm. As the astigmatism aberration in the sagittal direction shown in FIG. 27 part (b), the focus variation with respect to the three wavelengths in the whole field may fall within about ±0.035 mm. As the astigmatism aberration in the tangential direction shown in FIG. 27 part (c), the focus variation with respect to the three wavelengths in the whole field may fall within about ±0.02 m. As shown in FIG. 27 part (d), the variation of the distortion aberration may be within about +100%.

Compared with the first embodiment, Fno, the longitudinal spherical aberration and the astigmatism aberration of the optical imaging lens 6 may be smaller. Therefore, according to above illustration, the optical imaging lens 6 of the example embodiment, which may be capable of providing 100 degrees in HFOV, about 2.07 in Fno and about 18.361 mm in length, may indeed achieve greater optical performance.

Figure 30:
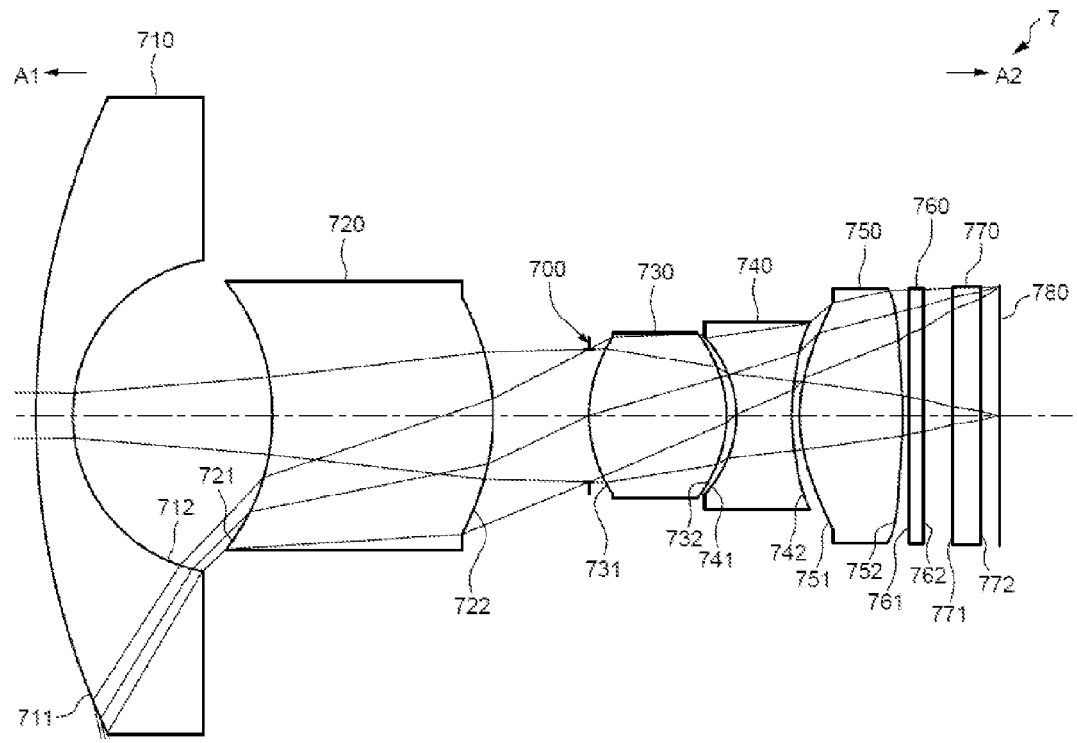
FIG. 30 is a cross-sectional view of a seventh embodiment of an optical imaging lens having five lens elements according to the present disclosure.
Figure 31:
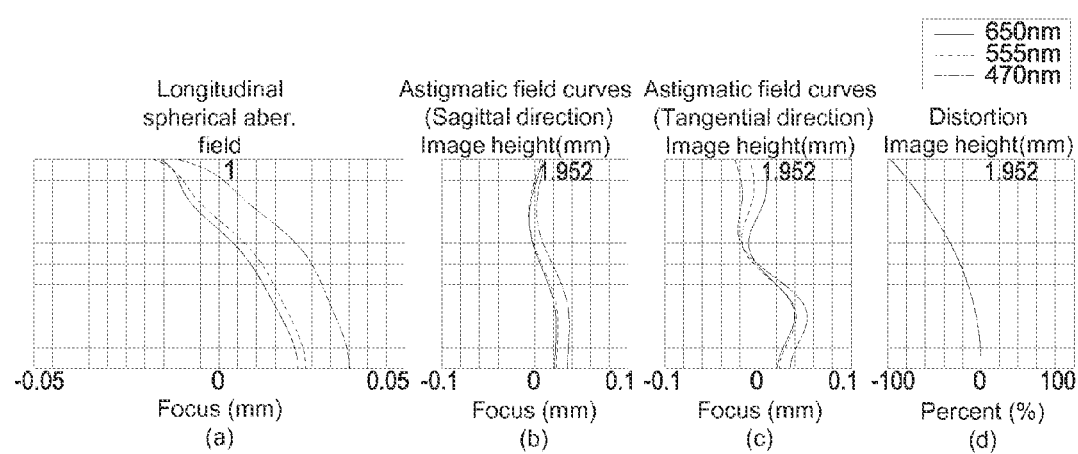
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having five lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, an aperture stop 700, a third lens element 730, a fourth lens element 740 and a fifth lens element 750.

The differences between the seventh embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 711, 721, 731, 741, 751 facing to the object side A1 and the image-side surfaces 712, 722, 732, 742, 752 facing to the image side A2, are similar to those in the first embodiment. Here, for clearly showing the drawings of the present embodiment, only the surface shapes which are different from that in the first embodiment are labeled. Please refer to FIG. 32 for the optical characteristics of each lens elements in the optical imaging lens 7 of the present embodiment, please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 711 of the first lens element 710 to the image plane 780 along the optical axis may be about 14.482 mm, the image height may be about 1.952 mm, HFOV may be about 102 degrees and Fno may be about 2.09. Thus, the optical imaging lens 7 may be capable of providing a large view angle. Please note that the length of the optical imaging lens 7 may be shorter than that of the first embodiment.

As the longitudinal spherical aberration shown in FIG. 31 part (a), the offset of the off-axis light relative to the image point may be within about ±0.04 mm. As the astigmatism aberration in the sagittal direction shown in FIG. 31 part (b), the focus variation with respect to the three wavelengths in the whole field may fall within about ±0.04 mm. As the astigmatism aberration in the tangential direction shown in FIG. 31 part (c), the focus variation with respect to the three wavelengths in the whole field may fall within about ±0.06 mm. As shown in FIG. 31 part (d), the variation of the distortion aberration may be within about ±100%.

Compared with the first embodiment, Fno and the astigmatism aberration of the optical imaging lens 7 may be smaller. Therefore, according to above illustration, the optical imaging lens 7 of the example embodiment, which may be capable of providing about 102 degrees in HFOV, about 2.09 in Fno and about 14.482 mm in length, may indeed achieve greater optical performance.

Figure 34:
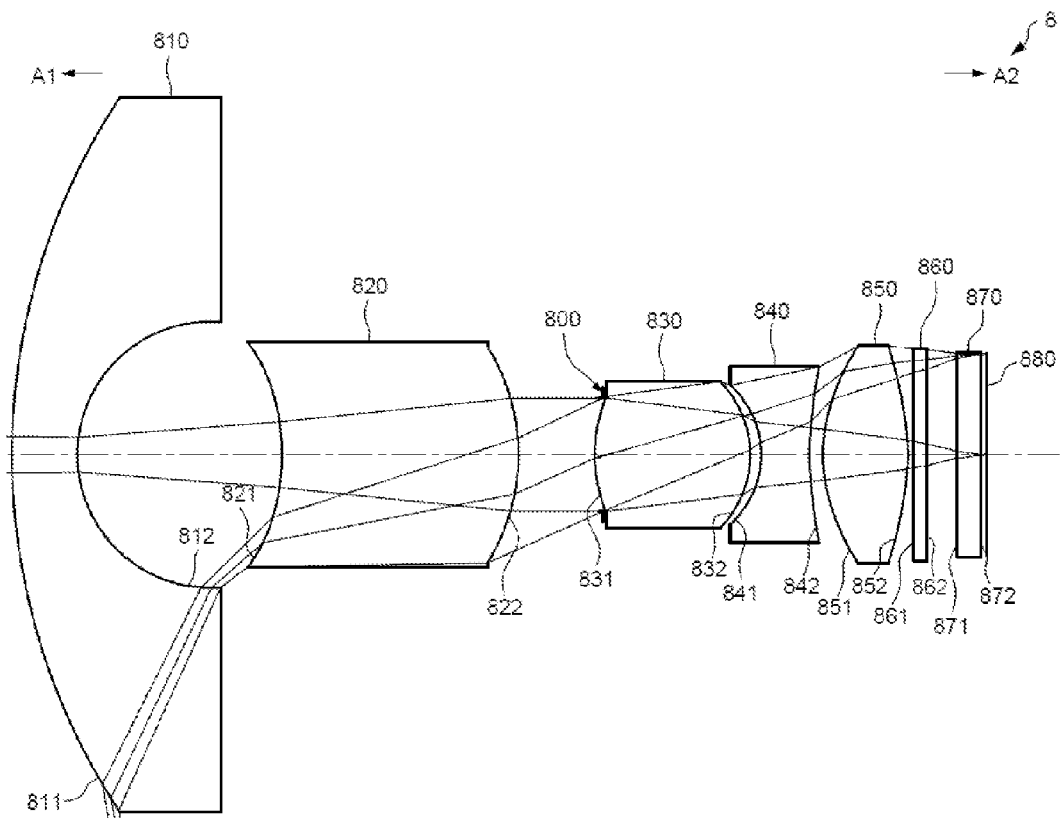
FIG. 34 is a cross-sectional view of an eighth embodiment of an optical imaging lens having five lens elements according to the present disclosure.
Figure 35:
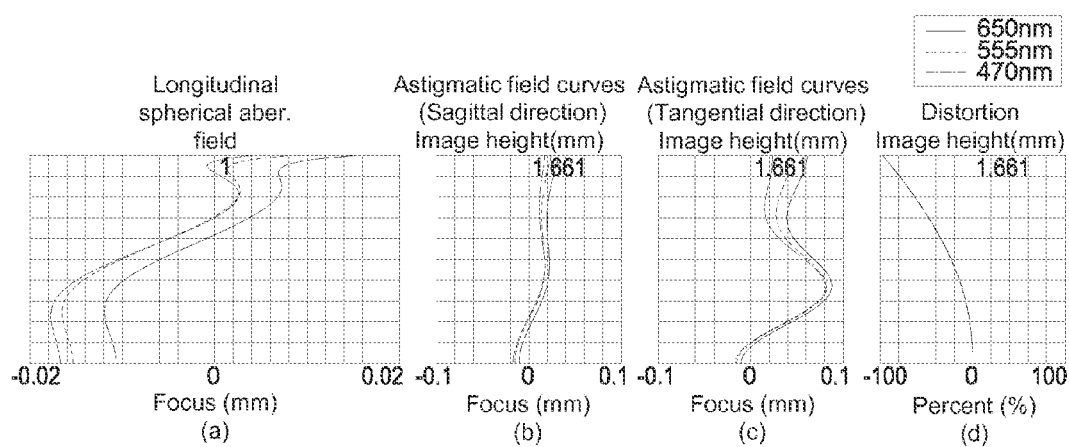
FIG. 35 is a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having five lens elements of the optical imaging lens according to a eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, an aperture stop 800, a third lens element 830, a fourth lens element 840 and a fifth lens element 850.

The differences between the eighth embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 811, 821, 831, 841, 851 facing to the object side A1 and the image-side surfaces 812, 822, 832, 842, 852 facing to the image side A2, are similar to those in the first embodiment. Here, for clearly showing the drawings of the present embodiment, only the surface shapes which are different from that in the first embodiment are labeled. Please refer to FIG. 36 for the optical characteristics of each lens elements in the optical imaging lens 8 of the present embodiment, please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 811 of the first lens element 810 to the image plane 880 along the optical axis may be about 16.006 mm, the image height may be about 1.661 mm, HFOV may be about 100 degrees and Fno may be about 2.08. Thus, the optical imaging lens 8 may be capable of providing a large view angle.

As the longitudinal spherical aberration shown in FIG. 35 part (a), the offset of the off-axis light relative to the image point may be within about ±0.018 mm. As the astigmatism aberration in the sagittal direction shown in FIG. 35 part (b), the focus variation with respect to the three wavelengths in the whole field may fall within about ±0.04 mm. As the astigmatism aberration in the tangential direction shown in FIG. 35 part (c), the focus variation with respect to the three wavelengths in the whole field may fall within about ±0.09 mm. As shown in FIG. 35 part (d), the variation of the distortion aberration may be within about ±100%.

Compared with the first embodiment, Fno, the longitudinal spherical aberration and the astigmatism aberration of the optical imaging lens 8 may be smaller. Therefore, according to above illustration, the optical imaging lens 8 of the example embodiment, which may be capable of providing about 100 degrees in HFOV, about 2.08 in Fno and about 16.006 mm in length, may indeed achieve great optical performance.

Figure 38:
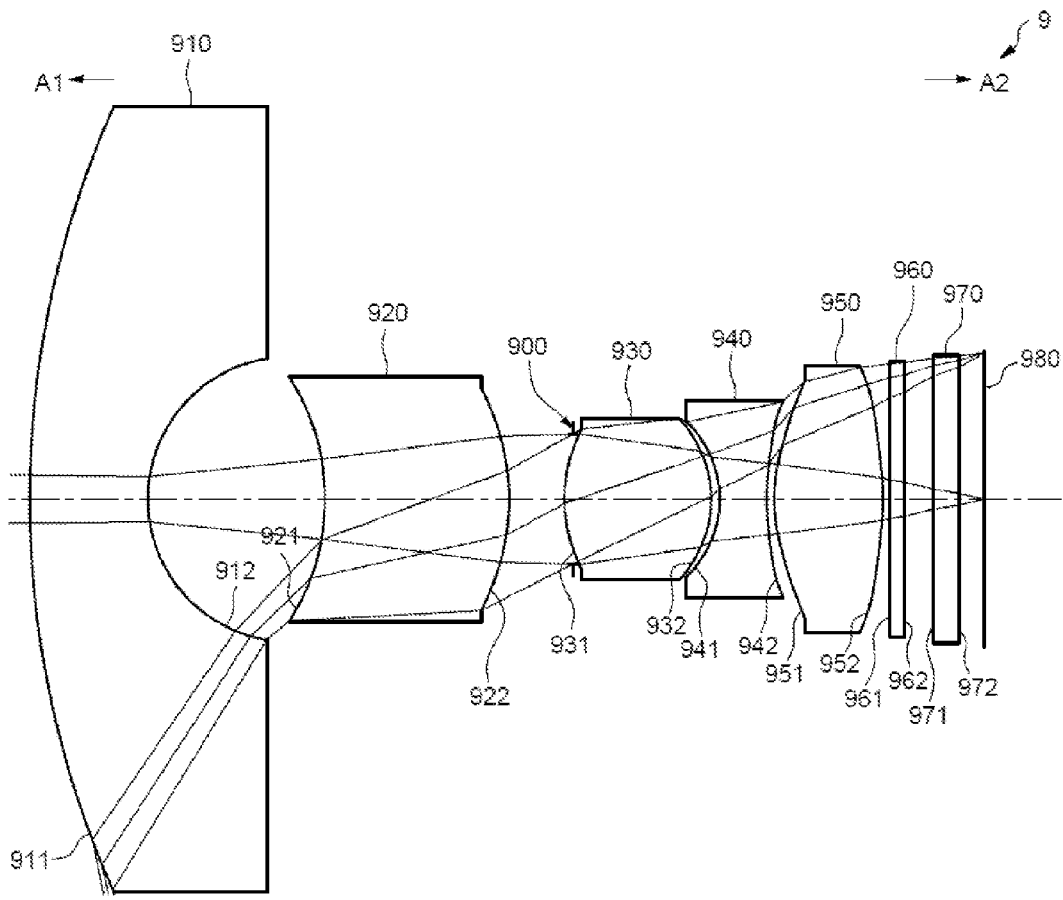
FIG. 38 is a cross-sectional view of a ninth embodiment of an optical imaging lens having five lens elements according to the present disclosure.
Figure 39:
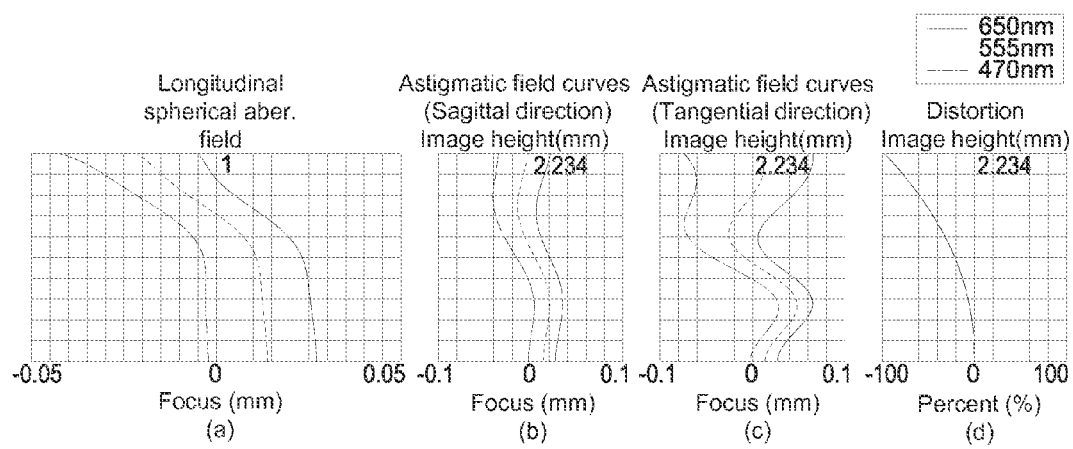
FIG. 39 is a chart of longitudinal spherical aberration and other kinds of optical aberrations of a ninth embodiment of the optical imaging lens according the present disclosure.

Reference is now made to FIGS. 38-41. FIG. 38 illustrates an example cross-sectional view of an optical imaging lens 9 having five lens elements of the optical imaging lens according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, an aperture stop 900, a third lens element 930, a fourth lens element 940 and a fifth lens element 950.

The differences between the ninth embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 911, 921, 931, 941, 951 facing to the object side A1 and the image-side surfaces 912, 922, 932, 942, 952 facing to the image side A2, are similar to those in the first embodiment. Here, for clearly showing the drawings of the present embodiment, only the surface shapes which are different from that in the first embodiment are labeled. Please refer to FIG. 40 for the optical characteristics of each lens elements in the optical imaging lens 9 of the present embodiment, please refer to FIG. 42 for the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of the present embodiment. The distance from the object-side surface 911 of the first lens element 910 to the image plane 980 along the optical axis may be about 14.526 mm, the image height may be about 2.234 mm, HFOV may be about 102 degrees and Fno may be about 2.10. Thus, the optical imaging lens 9 may be capable of providing a large view angle. Please note that the length of the optical imaging lens 9 may be shorter than that in the first embodiment.

As the longitudinal spherical aberration shown in FIG. 39 part (a), the offset of the off-axis light relative to the image point may be within about ±0.045 mm. As the astigmatism aberration in the sagittal direction shown in FIG. 39 part (b), the focus variation with respect to the three wavelengths in the whole field may fall within about ±0.05 mm. As the astigmatism aberration in the tangential direction shown in FIG. 39 part (c), the focus variation with respect to the three wavelengths in the whole field may fall within about ±0.08 mm. As shown in FIG. 39 part (d), the variation of the distortion aberration may be within about ±100%.

Compared with the first embodiment, Fno, the astigmatism aberration of the optical imaging lens 9 is smaller. Therefore, according to above illustration, the optical imaging lens 9 of the example embodiment, which may be capable of providing about 102 degrees in HFOV, about 2.10 in Fno and about 14.526 mm in length, may indeed achieve great optical performance.

Please refer to FIG. 42, which shows the values of T1, G12, T2, G23, T3, G34, T4, G45, T5, G5F, TF, GFC, TC, GCP, ALT, AAG, v1, v2, G12/G23, G23/(G34+T4), T2/T3, T2/T5, AAG/G34, ALTG12, G12/T1, T1/G23, T2/G23, T4/G23, AAG/G23 and |v1−v2| of all nine embodiments, and it is clear that the optical imaging lens of the present disclosure satisfy the Inequality (1) and/or Inequalities (1'), (2), (3), (4), (5), (6), (7), (8), (9), (10), (11) and/or (12).

Figure 43:
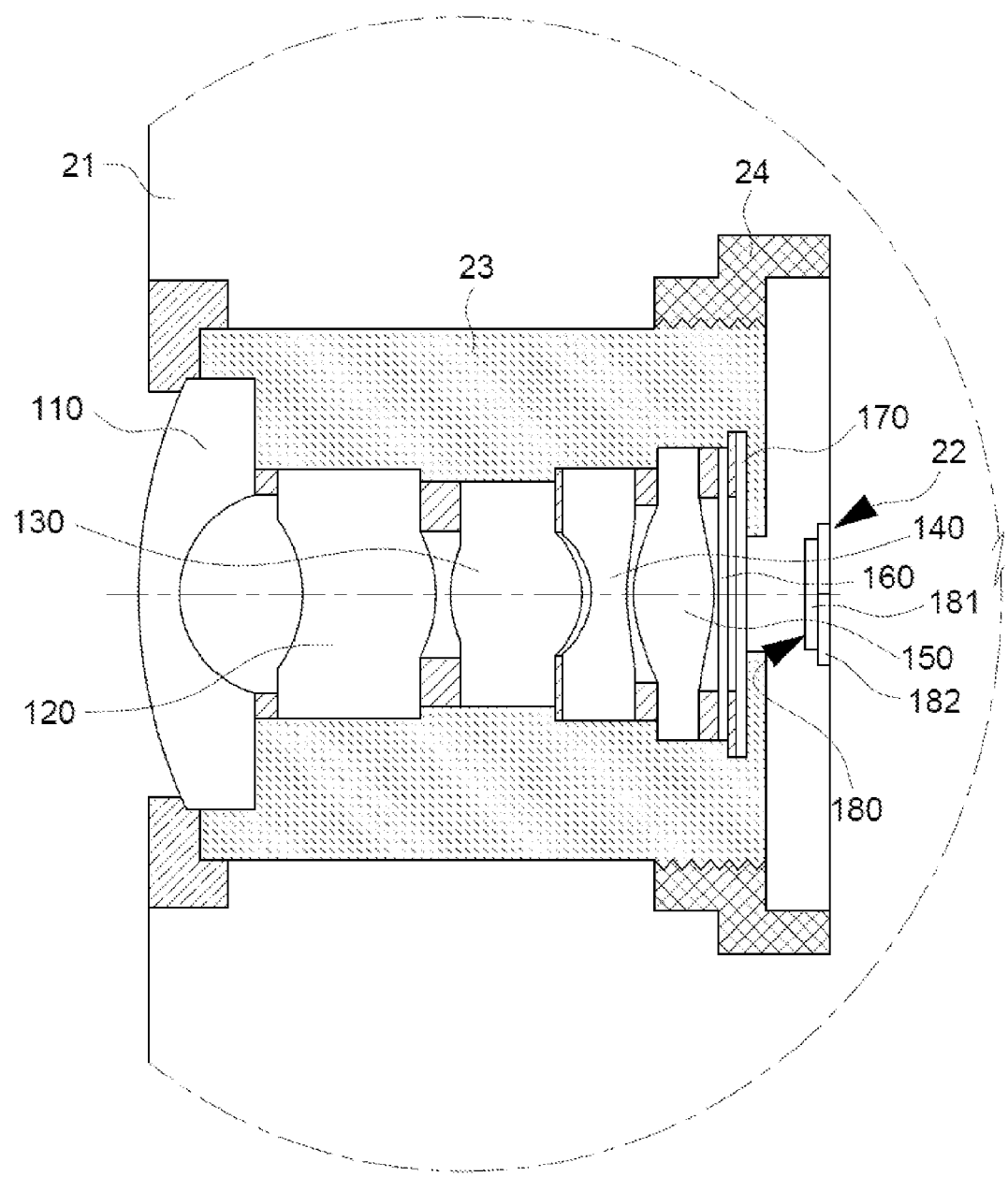
FIG. 43 is a structure of an example embodiment of a mobile device.

Reference is now made to FIG. 43, which illustrates an example structural view of a first embodiment of camera device 20 applying an aforesaid optical imaging lens. The camera device 20 may comprise a housing 21 and a photography module 22 positioned in the housing 21. Examples of the camera device 20 may be, but are not limited to, gaming machines, such as video game consoles, handhold game console, etc., event data recorders, reversing camera systems mounted on motor vehicles, wide-angle camera, etc.

As shown in FIG. 43, the photography module 22 may comprise an aforesaid optical imaging lens with five lens elements, which is a prime lens and for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned on the substrate 182 and at an image side of the optical imaging lens 1. The image plane 180 is formed on the image sensor 181.

In some other example embodiments, the structure of the filtering unit 160 may be omitted. In some example embodiments, the housing 21, the lens barrel 23, and/or the module housing unit 24 may be integrated into a single component or assembled by multiple components. In the present example embodiment, the image sensor 181 is in a chip scale package (CSP) which require a protective element 170 before the image sensor 181 in the optical imaging lens 1. The protective element 170 here is implemented by a cover glass; however, other exemplary embodiments are not limited to this specific package type to utilize a protective element.

The five lens elements 110, 120, 130, 140, 150 are positioned in the lens barrel 23 in the way of separated by an air gap between any two adjacent lens elements.

The module housing unit 24 may comprise a lens backseat 2401 for positioning the lens barrel 23 and an image sensor base 2406 positioned between the lens backseat 2401 and the image sensor 181. The lens barrel 23 and the lens backseat 2401 are positioned along a same axis I-I', and the lens backseat 2401 is close to the outside of the lens barrel 23. The image sensor base 2406 is exemplarily close to the lens backseat 2401 here. The image sensor base 2406 could be optionally omitted in some other embodiments of the present disclosure.

Because in the optical imaging lens 1, the distance between the object-side surface 111 of the first lens element 110 and the image plane 180 along the optical axis is 14.570 mm, the Fno is 2.10, and the HFOV is as high as 102 degrees, the imaging quality is good. Therefore, compared with current camera devices, the camera device of the present embodiment, which is capable to provide 102 degrees of HFOV, indeed achieves good optical characters as well as view angle.

According to above illustration, the longitudinal spherical aberration, astigmatism aberration both in the sagittal direction and tangential direction and distortion aberration in all embodiments are meet user term of a related product in the market. The off-axis light with respect to three different wavelengths (470 nm, 555 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of said first, second, third, fourth and fifth lens elements having refractive index, an object-side surface facing toward the object side and an image-side surface facing toward the image side, wherein:
said first lens element has negative refractive index, and said object-side surface thereof comprises a convex portion in a vicinity of the optical axis;
said second lens element has positive refractive index, and said object-side surface thereof comprises a concave portion in a vicinity of the optical axis;
said object-side surface of said third lens element comprises a convex portion in a vicinity of the optical axis;
said object-side surface of said fourth lens element comprises a concave portion in a vicinity of the optical axis;
said object-side surface of said fifth lens element comprises a convex portion in a vicinity of the optical axis;
the optical imaging lens comprises no other lenses having refractive index beyond said five lens elements; and
an air gap between said first lens element and said second lens element along the optical axis is represented by G12, an air gap between said second lens element and said third lens element along the optical axis is represented by G23, and G12 and G23 satisfy the inequality:

$10 \geq G12/G23 \geq 2.05$.

2. The optical imaging lens according to claim 1, wherein an air gap between said third lens element and said fourth lens element along the optical axis is represented by G34, a central thickness of said fourth lens element is represented by T4, and G23, G34 and T4 satisfy the inequality:

$G23/(G34+T4) \geq 0.53$.

3. The optical imaging lens according to claim 2, wherein a central thickness of said second lens element is represented by T2, a central thickness of said third lens element is represented by T3, and T2 and T3 satisfy the inequality:

$T2/T3 \geq 1$.

4. The optical imaging lens according to claim 2, wherein a central thickness of said second lens element is represented by T2, a central thickness of said fifth lens element is represented by T5, and T2 and T5 satisfy the inequality:

$T2/T5 \geq 1.65$.

5. The optical imaging lens according to claim 1, wherein an air gap between said third lens element and said fourth lens element along the optical axis is represented by G34, a sum of all four air gaps from said first lens element to said fifth lens element along the optical axis is represented by AAG, and G34 and AAG satisfy the inequality:

$AAG/G34 \geq 17$.

6. The optical imaging lens according to claim 5, wherein a central thickness of said second lens element is represented by T2, a central thickness of said third lens element is represented by T3, and T2 and T3 satisfy the inequality:

$T2/T3 \geq 1$.

7. The optical imaging lens according to claim 5, wherein a central thickness of said second lens element is represented by T2, a central thickness of said fifth lens element is represented by T5, and T2 and T5 satisfy the inequality:

$T2/T5 \geq 1.65$.

8. The optical imaging lens according to claim 1, wherein a sum of the central thicknesses of all five lens elements is represented by ALT, and G12 and ALT satisfy the inequality:

$ALT/G12 \geq 2.7$.

9. The optical imaging lens according to claim 1, wherein a central thickness of said first lens element is represented by T1, and T1 and G12 satisfy the inequality:

$G12/T1 \leq 3$.

10. An optical imaging lens, sequentially from an object side to an image side along an optical axis, comprising first, second, third, fourth and fifth lens elements, each of said first, second, third, fourth and fifth lens elements having refractive index, an object-side surface facing toward the object side and an image-side surface facing toward the image side, wherein:
said first lens element has negative refractive index, and said object-side surface thereof comprises a convex portion in a vicinity of the optical axis;
said object-side surface of said second lens element comprises a concave portion in a vicinity of the optical axis;
said object-side surface of said third lens element comprises a convex portion in a vicinity of the optical axis;
said object-side surface of said fourth lens element comprises a concave portion in a vicinity of the optical axis;
said object-side surface of said fifth lens element comprises a convex portion in a vicinity of the optical axis, said image-side surface of said fifth lens element comprises a convex portion in a vicinity of a periphery of the fifth lens element;
the optical imaging lens comprises no other lenses having refractive index beyond the five lens elements; and
an air gap between said first lens element and said second lens element along the optical axis is represented by G12, an air gap between said second lens element and said third lens element along the optical axis is represented by G23, and G12 and G23 satisfy the inequality:

$10 \geq G12/G23 \geq 2.05$.

11. The optical imaging lens according to claim 10, wherein an air gap between said third lens element and said fourth lens element along the optical axis is represented by G34, a central thickness of said fourth lens element is represented by T4, and G23, G34 and T4 satisfy the inequality:

$G23/(G34+T4) \geq 0.53$.

12. The optical imaging lens according to claim 10, wherein an air gap between said third lens element and said fourth lens element along the optical axis is represented by G34, a sum of all four air gaps from said first lens element to said fifth lens element along the optical axis is represented by AAG, and G34 and AAG satisfy the inequality:

$AAG/G34 \geq 17$.

13. The optical imaging lens according to claim 10, wherein a sum of the central thicknesses of all five lens elements is represented by ALT, and G12 and ALT satisfy the inequality:

$ALT/G12 \geq 2.7$.

14. The optical imaging lens according to claim 10, wherein a central thickness of said first lens element is represented by T1, and T1 and G12 satisfy the inequality:

$G12/T1 \leq 3$.

15. The optical imaging lens according to claim 10, wherein a central thickness of said first lens element is represented by T1, and T1 and G23 satisfy the inequality:

$T1/G23 \leq 3.4$.

16. The optical imaging lens according to claim 10, wherein a central thickness of said second lens element is represented by T2, and T2 and G23 satisfy the inequality:

$T2/G23 \leq 9$.

17. The optical imaging lens according to claim 10, wherein a central thickness of said fourth lens element is represented by T4, and T4 and G23 satisfy the inequality:

$T4/G23 \leq 2.4$.

18. The optical imaging lens according to claim 10, wherein a sum of all four air gaps from said first lens element to said fifth lens element along the optical axis is represented by AAG, and G23 and AAG satisfy the inequality:

$AAG/G23 \leq 12$.

19. The optical imaging lens according to claim 10, wherein an abbe number of said first lens element is represented by v1, an abbe number of said second lens element is represented by v2, and v1 and v2 satisfy the inequality:

$|v1-v2| \geq 15$.

* * * * *